US012689732B2

(12) United States Patent
Lin et al.

(10) Patent No.: US 12,689,732 B2
(45) Date of Patent: Jul. 21, 2026

(54) SUPER RESOLUTION POSITION AND NETWORK STRUCTURE

(71) Applicants: Beijing Bytedance Network Technology Co., Ltd., Beijing (CN); Bytedance Inc., Los Angeles, CA (US)

(72) Inventors: Chaoyi Lin, Beijing (CN); Yue Li, San Diego, CA (US); Kai Zhang, San Diego, CA (US); Zhaobin Zhang, San Diego, CA (US); Li Zhang, San Diego, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 1 day.

(21) Appl. No.: 18/397,302

(22) Filed: Dec. 27, 2023

(65) Prior Publication Data

US 2024/0137517 A1    Apr. 25, 2024

Related U.S. Application Data

(63) Continuation of application No. PCT/CN2022/103355, filed on Jul. 1, 2022.

(30) Foreign Application Priority Data

Jul. 1, 2021    (WO) ................ PCT/CN2021/104099

(51) Int. Cl.
*H04N 19/132*        (2014.01)
*G06T 3/4046*        (2024.01)
        (Continued)

(52) U.S. Cl.
CPC ......... *H04N 19/132* (2014.11); *G06T 3/4046* (2013.01); *G06T 3/4053* (2013.01);
        (Continued)

(58) Field of Classification Search
CPC ...... H04N 19/132; H04N 19/33; H04N 19/59; H04N 19/88; G06T 3/4046
See application file for complete search history.

(56) References Cited

U.S. PATENT DOCUMENTS

| | | | | |
|---|---|---|---|---|
| 8,837,579 B2 * | 9/2014 | Kanumuri | .............. | H04N 19/18 |
| | | | | 375/240.01 |
| 12,206,855 B2 * | 1/2025 | Yea | ........................ | H04N 19/33 |

(Continued)

FOREIGN PATENT DOCUMENTS

| | | |
|---|---|---|
| CN | 112750094 A | 5/2021 |
| CN | 112907449 A | 6/2021 |

(Continued)

OTHER PUBLICATIONS

Matsuo translation of JP 2020150422 A Mar. 13, 2019 (Year: 2019).*

(Continued)

*Primary Examiner* — Zaihan Jiang
(74) *Attorney, Agent, or Firm* — Conley Rose, P.C.

(57) ABSTRACT

A method of processing video data. The method includes applying a super resolution (SR) process to a video unit at a specific position relative to one or more in-loop filters when the one or more in-loop filters are applied to the video unit, and performing a conversion between a video comprising the video unit and a bitstream of the video based on the SR process and the one or more in-loop filters as applied. A corresponding video coding apparatus and non-transitory computer-readable recording medium are also disclosed.

18 Claims, 15 Drawing Sheets

1700

Apply a super resolution (SR) process to a video unit at a specific position relative to one or more in-loop filters when the one or more in-loop filters are applied to the video unit ⟋1702

Perform a conversion between a video comprising the video unit and a bitstream of the video based on the SR process and the one or more in-loop filters as applied ⟋1704

(51) Int. Cl.

| | |
|---|---|
| *G06T 3/4053* | (2024.01) |
| *H04N 19/33* | (2014.01) |
| *H04N 19/59* | (2014.01) |
| *H04N 19/88* | (2014.01) |

(52) U.S. Cl.
CPC ............. *H04N 19/33* (2014.11); *H04N 19/59* (2014.11); *H04N 19/88* (2014.11)

(56) References Cited

U.S. PATENT DOCUMENTS

| | | | |
|---|---|---|---|
| 2010/0220939 A1* | 9/2010 | Tourapis ............... | H04N 19/577 382/261 |
| 2016/0048947 A1 | 2/2016 | Lakshman | |
| 2017/0256033 A1 | 9/2017 | Tuzel | |
| 2017/0337711 A1 | 11/2017 | Ratner | |
| 2018/0295320 A1 | 10/2018 | Breternitz | |
| 2019/0026864 A1 | 1/2019 | Chen | |
| 2019/0052911 A1* | 2/2019 | Zhang ................... | H04N 19/136 |
| 2019/0394482 A1 | 12/2019 | Joshi | |
| 2020/0043135 A1 | 2/2020 | Chou | |
| 2020/0186809 A1* | 6/2020 | Mukherjee ............. | H04N 19/30 |
| 2020/0327702 A1 | 10/2020 | Wang | |
| 2021/0021823 A1 | 1/2021 | Na | |
| 2021/0090217 A1 | 3/2021 | Jiang | |
| 2021/0099722 A1 | 4/2021 | Da Silva Pratas Gabriel | |
| 2021/0118095 A1 | 4/2021 | Kim | |
| 2021/0120255 A1 | 4/2021 | Fang | |
| 2021/0125310 A1 | 4/2021 | Pu | |
| 2021/0158489 A1 | 5/2021 | Watanabe | |
| 2021/0166348 A1 | 6/2021 | Na | |
| 2021/0168405 A1 | 6/2021 | Hsiao | |
| 2021/0211643 A1 | 7/2021 | Da Silva Pratas Gabriel | |
| 2021/0327028 A1 | 10/2021 | Machii | |
| 2022/0103832 A1 | 3/2022 | Grois | |
| 2022/0191523 A1 | 6/2022 | Egilmez | |
| 2022/0201307 A1 | 6/2022 | Yea | |
| 2022/0222505 A1 | 7/2022 | Jiang | |
| 2022/0224901 A1 | 7/2022 | Jiang | |
| 2022/0230310 A1 | 7/2022 | Xie | |
| 2022/0321919 A1 | 10/2022 | Deshpande | |
| 2022/0329836 A1* | 10/2022 | Li ........................... | H04N 19/30 |
| 2022/0358571 A1 | 11/2022 | Gabale | |
| 2022/0366538 A1 | 11/2022 | Kim | |
| 2023/0007246 A1* | 1/2023 | Li ......................... | H04N 19/117 |
| 2023/0023579 A1* | 1/2023 | Li ......................... | H04N 19/61 |
| 2023/0044180 A1 | 2/2023 | Akimoto | |
| 2023/0051066 A1* | 2/2023 | Li ......................... | H04N 19/186 |
| 2023/0052774 A1 | 2/2023 | Kim | |
| 2023/0141157 A1 | 5/2023 | Otsuka | |
| 2023/0325985 A1 | 10/2023 | Kim | |
| 2023/0388490 A1 | 11/2023 | Liu | |
| 2024/0040160 A1 | 2/2024 | Meardi | |
| 2024/0054602 A1 | 2/2024 | Lee | |
| 2024/0098271 A1 | 3/2024 | Yuan | |
| 2024/0153033 A1 | 5/2024 | Wang | |
| 2025/0039383 A1* | 1/2025 | Yuan ................... | H04N 19/126 |

FOREIGN PATENT DOCUMENTS

| | | | |
|---|---|---|---|
| CN | 113039792 A | | 6/2021 |
| JP | 2020150422 A | * | 9/2020 |
| WO | 2019059721 A1 | | 3/2019 |
| WO | WO-2021064413 | * | 10/2020 |

OTHER PUBLICATIONS

Document: JVET-S2001-vH, Brose, B., et al., "Versatile Video Coding (Draft 10)," Joint Video Experts Team (JVET) of ITU-T SG 16 WP 3 and ISO/IEC JTC 1/SC 29/WG 11 19th Meeting: by teleconference, Jun. 22-Jul. 1, 2020, 548 pages.

Document: JVET-Q2002-v3 Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.

VTM software, Retrieved from the internet: https://vcgit.hhi.fraunhofer.de/jvet/VVCSoftware_VTM, Mar. 26, 2024, 3 pages.

Shi, W., et al., "Real-Time Single Image and Video Super-Resolution Using an Efficient Sub-Pixel Convolutional Neural Network," Proceedings of the IEEE conference on computer vision and pattern recognition, arXiv:1609.05158v2 [cs.CV] Sep. 23, 2016, 10 pages.

Lin, J., et al., "Convolutional Neural Network-Based Block Up-Sampling for HEVC," IEEE Transactions on Circuits and Systems for Video Technology, vol. 29, No. 12, Dec. 2019, doi:10.1109/TCSVT.2018.2884203, 15 pages.

International Search Report from PCT Application No. PCT/CN2022/103355 dated Sep. 23, 2022, 9 pages.

Document: JVET-V0096-v4, Kotra, A., et al., "EE1-2.3: Neural Network-based Super Resolution," Joint Video Experts Team (JVET) of ITU-T SG 16 WP 3 and ISO/IEC JTC 1/SC 29 22nd Meeting, by teleconference, Apr. 20-28, 2021, 5 pages.

Non-Final Office Action from U.S. Appl. No. 18/399,926 dated May 19, 2025, 31 pages.

Non-Final Office Action from U.S. Appl. No. 18/397,420 dated May 21, 2025, 24 pages.

Non-Final Office Action from U.S. Appl. No. 18/400,363 dated Apr. 2, 2025, 20 pages.

Non-Final Office Action from U.S. Appl. No. 18/398,835 dated Oct. 1, 2025, 33 pages.

* cited by examiner

100

300

400

500

500

500

500

600

700

800

1000

1300

1700

Apply a super resolution (SR) process to a video unit at a specific position relative to one or more in-loop filters when the one or more in-loop filters are applied to the video unit    ⌐1702

Perform a conversion between a video comprising the video unit and a bitstream of the video based on the SR process and the one or more in-loop filters as applied    ⌐1704

SUPER RESOLUTION POSITION AND NETWORK STRUCTURE

CROSS-REFERENCE TO RELATED APPLICATIONS

This patent application is a continuation of International Patent Application No. PCT/CN2022/103355, filed on Jul. 1, 2022, which claims the priority to and benefit of International Application No. PCT/CN2021/104099 filed Jul. 1, 2021. All the aforementioned patent applications are hereby incorporated by reference in their entireties.

TECHNICAL FIELD

The present disclosure is generally related to video coding and, in particular, to super-resolution-based up-sampling for video coding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed aspects/embodiments provide techniques that apply a super resolution (SR) process to a video unit at a specific position relative to one or more in-loop filters when the one or more in-loop filters are applied to the video unit. In an embodiment, the specific position is a location of the SR process within an overall video coding process. That is, the specific position identified where, in a sequential order of operations, the SR process is applied relative to in-loop filters. Such in-loop filters may be, for example, a deblocking filter (DBF), a sample adaptive offset (SAO), and an adaptive loop filter (ALF). The techniques can be used by video and image encoding, decoding, streaming and storing implementations. Thus, the video coding process is improved relative to conventional video coding techniques.

A first aspect relates to a method of processing video data. The method includes applying a super resolution (SR) process to a video unit at a specific position relative to one or more in-loop filters when the one or more in-loop filters are applied to the video unit; and performing a conversion between a video comprising the video unit and a bitstream of the video based on the SR process and the one or more in-loop filters as applied.

Optionally, in any of the preceding aspects, another implementation of the aspect provides that the specific position of the SR process is prior to the one or more in-loop filters.

Optionally, in any of the preceding aspects, another implementation of the aspect provides that the specific position is immediately after the video unit has been reconstructed.

Optionally, in any of the preceding aspects, another implementation of the aspect provides that the video unit comprises a block, and wherein the block comprises one of a coding tree unit (CTU) and a coding tree block (CTB).

Optionally, in any of the preceding aspects, another implementation of the aspect provides that the video unit comprises a region, and wherein the region comprises a coding tree unit (CTU) row.

Optionally, in any of the preceding aspects, another implementation of the aspect provides that the one or more in-loop filters comprise a first in-loop filter and a second in-loop filter, and wherein the specific position is after the first in-loop filter and prior to the second in-loop filter.

Optionally, in any of the preceding aspects, another implementation of the aspect provides that the one or more in-loop filters comprise a deblocking filter (DBF), and wherein the specific position is prior to the DBF.

Optionally, in any of the preceding aspects, another implementation of the aspect provides that the one or more in-loop filters comprise a deblocking filter (DBF) and a sample adaptive offset (SAO), and wherein the specific position is after the DBF and prior to the SAO.

Optionally, in any of the preceding aspects, another implementation of the aspect provides that the one or more in-loop filters comprise a sample adaptive offset (SAO) and an adaptive loop filter (ALF), and wherein the specific position is after the SAO and prior to the ALF.

Optionally, in any of the preceding aspects, another implementation of the aspect provides that the one or more in-loop filters comprise an adaptive loop filter (ALF), and wherein the specific position is after the ALF.

Optionally, in any of the preceding aspects, another implementation of the aspect provides that the one or more in-loop filters comprise a sample adaptive offset (SAO), and wherein the specific position is prior to the SAO.

Optionally, in any of the preceding aspects, another implementation of the aspect provides that the one or more in-loop filters comprise an adaptive loop filter (ALF), and wherein the specific position is prior to the ALF.

Optionally, in any of the preceding aspects, another implementation of the aspect provides that the one or more in-loop filters comprise a first filter, and wherein the specific position is prior to the first filter when the first filter accounts for an original video unit.

Optionally, in any of the preceding aspects, another implementation of the aspect provides that the specific position is included in the bitstream.

Optionally, in any of the preceding aspects, another implementation of the aspect provides that the specific position is derived based on decoded information.

Optionally, in any of the preceding aspects, another implementation of the aspect provides applying the SR process to the video unit without regard to the specific position when the one or more in-loop filters are not applied to the video unit.

Optionally, in any of the preceding aspects, another implementation of the aspect provides that the one or more in-loop filters comprise a deblocking filter (DBF), an sample adaptive offset (SAO) and an adaptive loop filter (ALF), and wherein the method further comprises applying the SR process to the video unit without regard to the specific position when the DBF, SAO, and ALF are disabled.

Optionally, in any of the preceding aspects, another implementation of the aspect provides that the one or more in-loop filters comprise an adaptive loop filter (ALF), and wherein the method further comprises applying the SR process to the video unit without regard to the specific position when the ALF is disabled.

Optionally, in any of the preceding aspects, another implementation of the aspect provides that the one or more in-loop filters comprise a cross component adaptive loop filter (CC-ALF), wherein the video unit comprises chroma components, and wherein the method further comprises applying the SR process to the chroma components without regard to the specific position when the CC-ALF is disabled.

Optionally, in any of the preceding aspects, another implementation of the aspect provides signaling of side information for the one or more in-loop filters is dependent on application of the SR process.

Optionally, in any of the preceding aspects, another implementation of the aspect provides that application of the SR process is dependent on a usage of an in-loop filtering method.

Optionally, in any of the preceding aspects, another implementation of the aspect provides that the SR process is applied by a neural network (NN)-based SR network comprising a plurality of convolutional layers, and wherein the plurality of convolutional layers includes an up-sampling layer configured to up-sample a resolution of the video unit.

Optionally, in any of the preceding aspects, another implementation of the aspect provides that the up-sampling layer applies de-convolution with a stride of K to up-sample the resolution of the video unit, where K is an integer greater than 1.

Optionally, in any of the preceding aspects, another implementation of the aspect provides that K is dependent on decoded information.

Optionally, in any of the preceding aspects, another implementation of the aspect provides that the up-sampling layer applies pixel shuffling to up-sample the resolution of the video unit.

Optionally, in any of the preceding aspects, another implementation of the aspect provides that a resolution of an input of the NN-based SR network is 1/K of an original input, where K is a down-sampling ratio.

Optionally, in any of the preceding aspects, another implementation of the aspect provides that a first convolutional layer from the plurality of convolutional layers is configured to fuse an input of the NN-based SR network to generate feature maps.

Optionally, in any of the preceding aspects, another implementation of the aspect provides that the NN-based SR network further comprises sequentially stacked residual blocks, and wherein the sequentially stacked residual blocks are configured to process the feature maps received from the first convolutional layer.

Optionally, in any of the preceding aspects, another implementation of the aspect provides that a last convolutional layer from the plurality of convolutional layers is configured to process the feature maps received from a last residual block from the sequentially stacked residual blocks to produce R feature maps, where R equals K*K.

Optionally, in any of the preceding aspects, another implementation of the aspect provides that a shuffle layer is configured to generate the video unit based on the R feature maps, and wherein a spatial resolution of the video unit is the same as the spatial resolution of the original input.

Optionally, in any of the preceding aspects, another implementation of the aspect provides that one or more of the sequentially stacked residual blocks consists of, in sequential order, the first convolutional layer, a parametric rectified linear unit (PReLU) activation function, and a second convolutional layer from the plurality of convolutional layers.

Optionally, in any of the preceding aspects, another implementation of the aspect provides that an input of the first convolutional layer is added to an output of the second convolutional layer.

Optionally, in any of the preceding aspects, another implementation of the aspect provides that the SR process is applied by a neural network (NN)-based SR network, and wherein an input of the SR process is at the video unit level, wherein the video unit is a sequence of pictures, a picture, a slice, a tile, a brick, a subpicture, one or more coding tree unit (CTUs), a CTU row, one or more coding units (CUs), one or more coding tree blocks (CTBs), or a region covering more than one pixel.

Optionally, in any of the preceding aspects, another implementation of the aspect provides that the SR process is applied by a neural network (NN)-based SR network, and wherein an input of the SR process is a coding tree unit (CTU), and wherein the CTU has been down-sampled.

Optionally, in any of the preceding aspects, another implementation of the aspect provides that the SR process is applied by a neural network (NN)-based SR network, and wherein an input of the SR process is a frame, and wherein the frame has been down-sampled.

Optionally, in any of the preceding aspects, another implementation of the aspect provides that the SR process is applied by a neural network (NN)-based SR network, and wherein an input of the SR process comprises a luma component of reconstruction.

Optionally, in any of the preceding aspects, another implementation of the aspect provides that the SR process is applied by a neural network (NN)-based SR network, and wherein an input of the SR process comprises a chroma component of reconstruction.

Optionally, in any of the preceding aspects, another implementation of the aspect provides that the SR process is applied by a neural network (NN)-based SR network, and wherein an input of the SR process comprises both luma and chroma components of reconstruction.

Optionally, in any of the preceding aspects, another implementation of the aspect provides that the SR process is applied by a neural network (NN)-based SR network, wherein an input of the SR process comprises a luma component, and wherein an output of the SR process comprises an up-sampled chroma component.

Optionally, in any of the preceding aspects, another implementation of the aspect provides that the SR process is applied by a neural network (NN)-based SR network, wherein an input of the SR process comprises a chroma component, and wherein an output of the SR process comprises an up-sampled luma component.

Optionally, in any of the preceding aspects, another implementation of the aspect provides that the SR process is applied by a neural network (NN)-based SR network, and wherein an input of the SR process comprises decoded side information.

Optionally, in any of the preceding aspects, another implementation of the aspect provides that an input of the SR process comprises a prediction picture, and wherein an output of the SR process is an up-sampled prediction picture.

Optionally, in any of the preceding aspects, another implementation of the aspect provides that wherein the conversion includes encoding the video data into the bitstream.

Optionally, in any of the preceding aspects, another implementation of the aspect provides that the conversion includes decoding the video data from the bitstream.

An apparatus for processing media data comprising a processor and a non-transitory memory with instructions thereon, wherein the instructions upon execution by the processor, cause the processor to: apply a super resolution (SR) process to a video unit at a specific position relative to one or more in-loop filters when the one or more in-loop filters are applied to the video unit; and perform a conversion between a video comprising the video unit and a bitstream of the video based on the SR process and the one or more in-loop filters as applied.

A non-transitory computer-readable recording medium storing a bitstream of a video which is generated by a method performed by a video processing apparatus, wherein the method comprises: applying a super resolution (SR) process to a video unit at a specific position relative to one or more in-loop filters when the one or more in-loop filters are applied to the video unit; and generating the bitstream based on the SR process and the one or more in-loop filters as applied.

An apparatus for processing media data comprising a processor and a non-transitory memory with instructions thereon, wherein the instructions upon execution by the processor, cause the processor to perform a method recited in any of the disclosed embodiments.

A non-transitory computer-readable recording medium storing a bitstream of a video which is generated by a method, recited in any of the disclosed embodiments, performed by a video processing apparatus.

A computer-readable program medium having code stored thereupon, the code comprising instructions that, when executed by a processor, causes the processor to implement a method recited in any of the disclosed embodiments.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims

BRIEF DESCRIPTION OF THE DRAWINGS

For a more complete understanding of this disclosure, reference is now made to the following brief description, taken in connection with the accompanying drawings and detailed description, wherein like reference numerals represent like parts.

6

Figure 13:
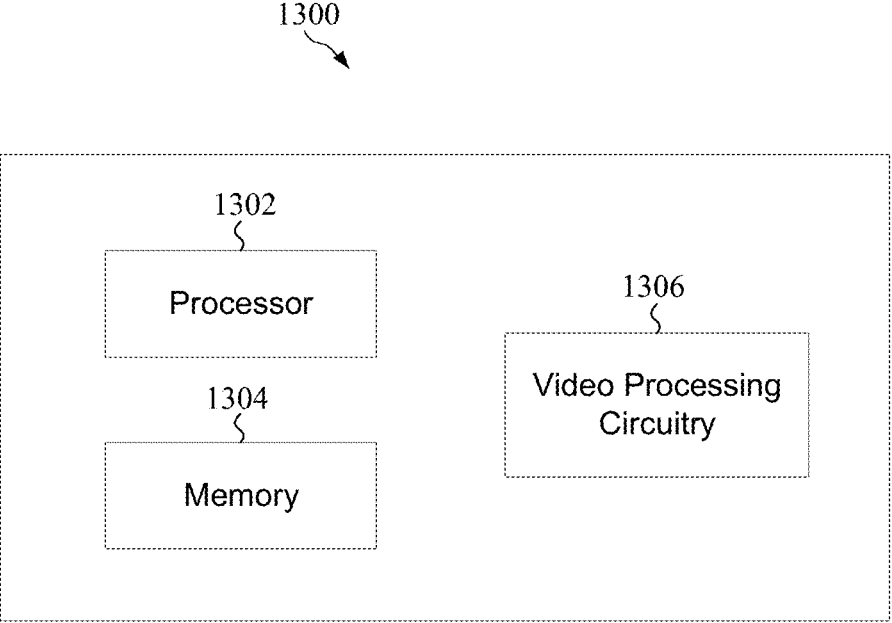

FIG. 13 is a block diagram of a video processing apparatus.

Figure 14:
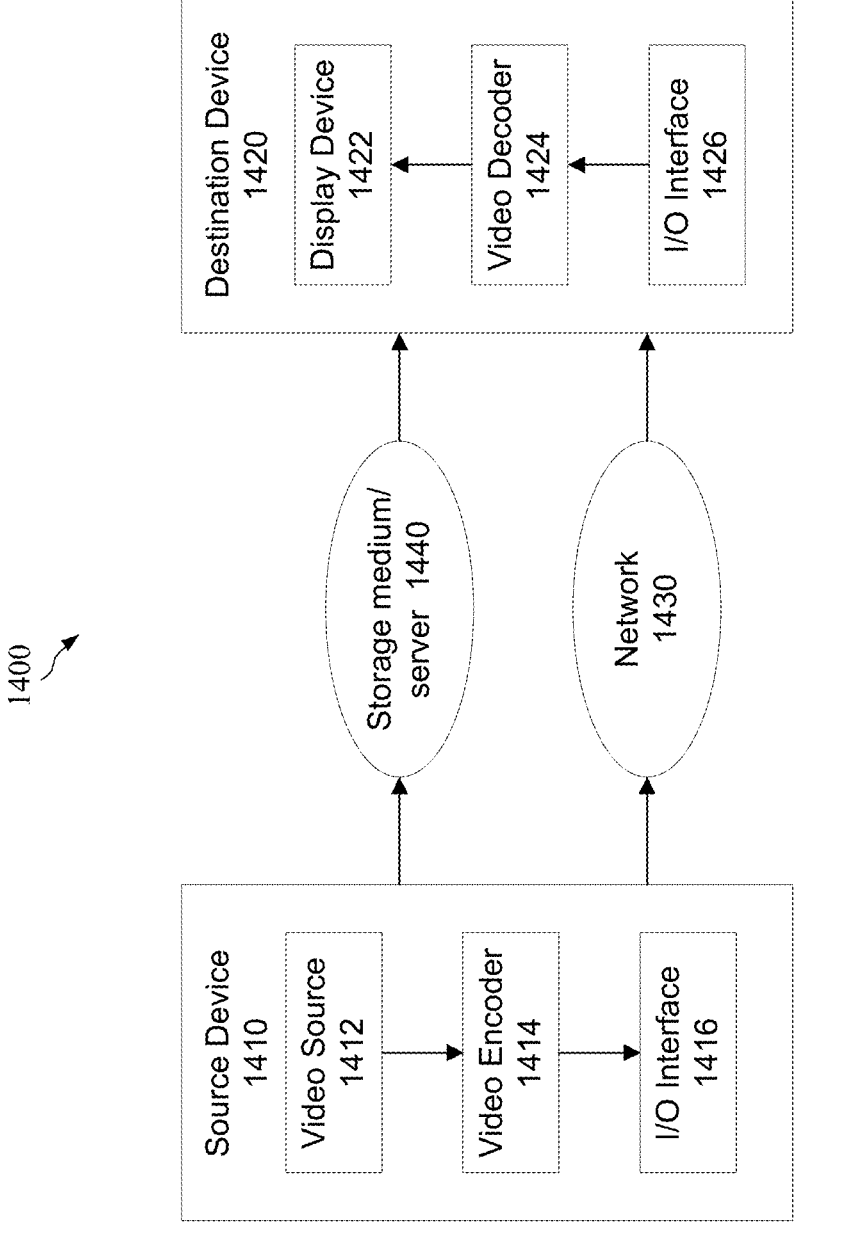

FIG. 14 is a block diagram that illustrates an example of a video coding system.

Figure 15:
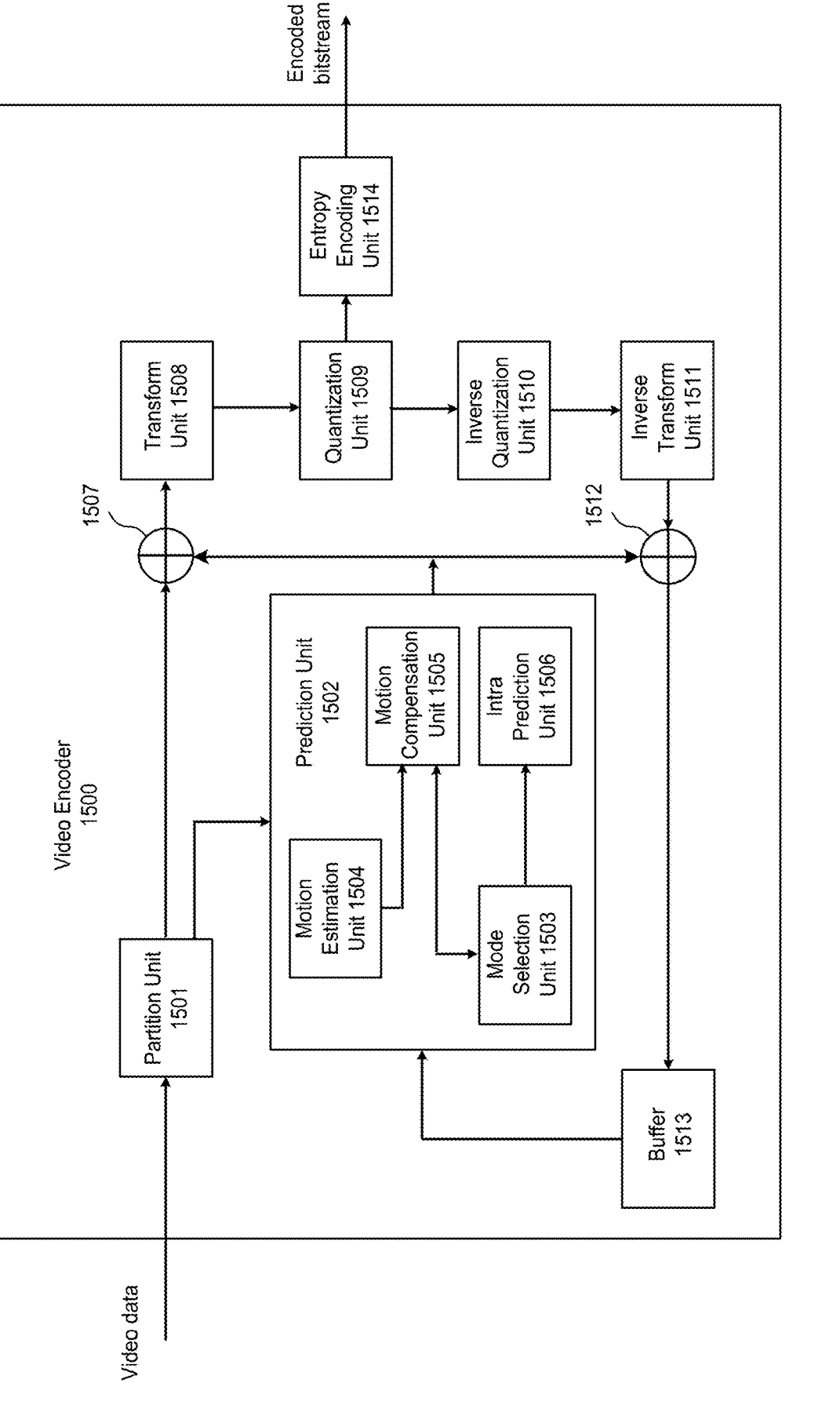

FIG. 15 is a block diagram illustrating an example of a video encoder.

Figure 16:
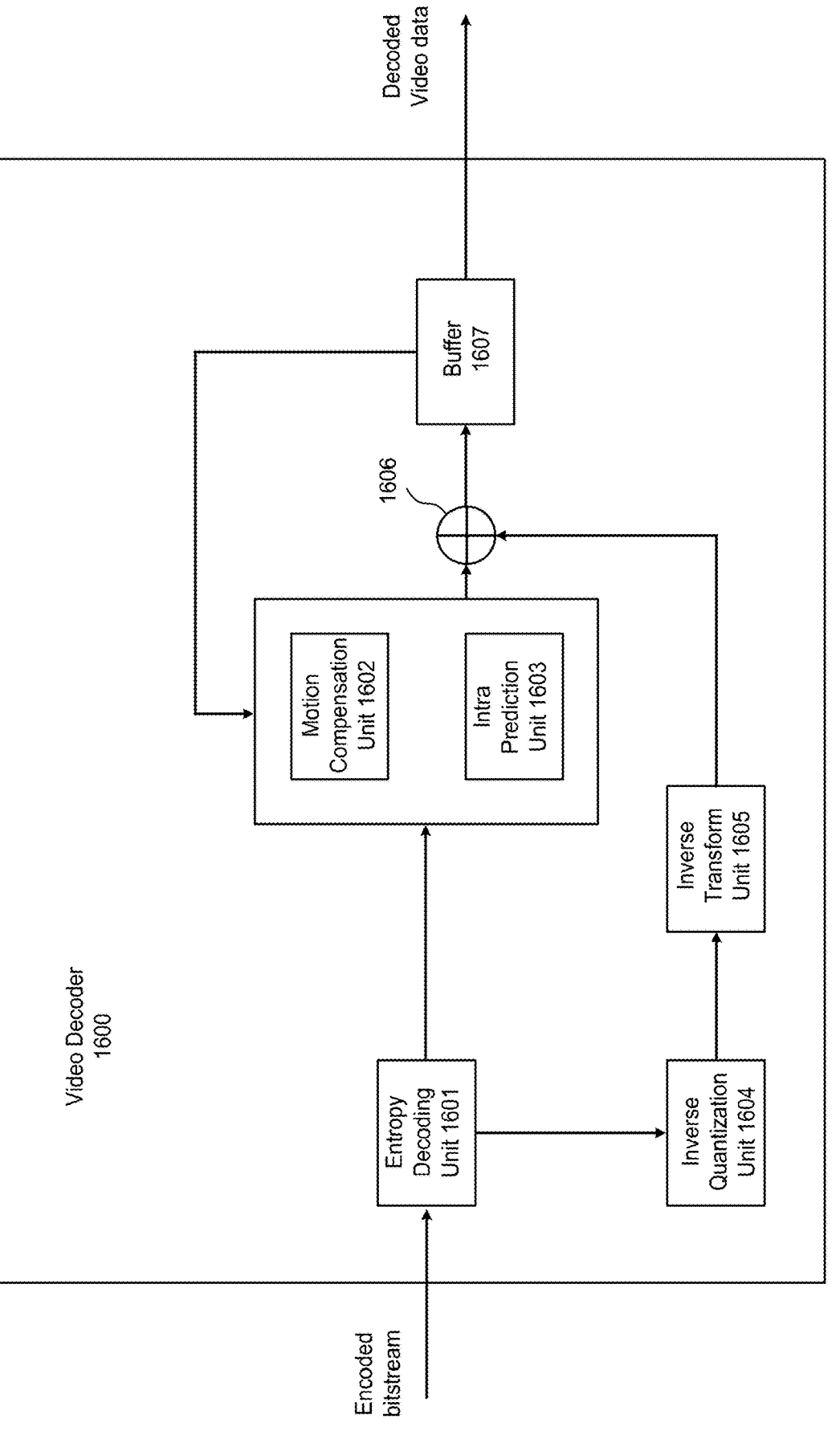

FIG. 16 is a block diagram illustrating an example of a video decoder.

Figure 17:

FIG. 17 is a method of processing video data according to an embodiment of the disclosure.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Video coding standards have evolved primarily through the development of the well-known International Telecommunication Union—Telecommunication (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards.

Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM).

In April 2018, the Joint Video Expert Team (JVET) between VCEG (Q6/16) and ISO/IEC JTC1 SC29/WG11 (MPEG) was created to work on the Versatile Video Coding (VVC) standard targeting at fifty percent (50%) bitrate reduction compared to HEVC. VVC version 1 was finalized in July 2020.

The latest version of VVC, which is known as H.266, is embodied in the ITU-T document entitled "Versatile Video Coding," published August 2020. The reference software for VVC is known as the VVC Test Model (VTM). The VTM is embodied in the JVET document entitled "JVET-Software Manual," by Bossen, et al., published Aug. 13, 2020. H.266 terminology is used in some description only for ease of understanding and not for limiting scope of the disclosed techniques. As such, the techniques described herein are applicable to other video codec protocols and designs also.

Figure 1:
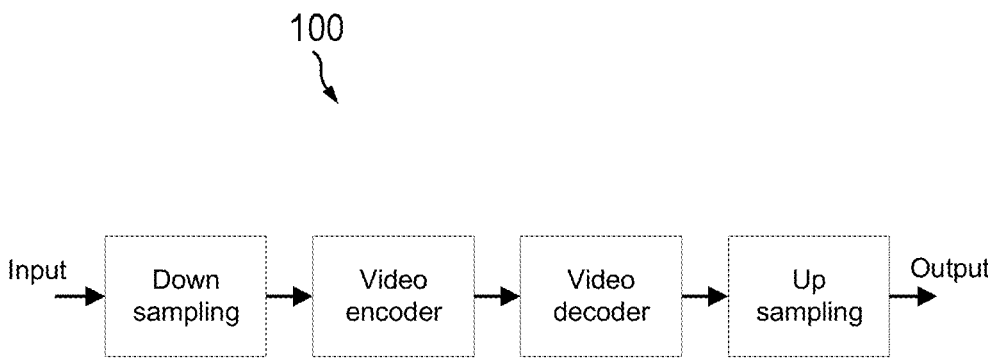
FIG. 1 is a schematic diagram illustrating an example application of reference picture resampling (RPR).

FIG. 1 is a schematic diagram illustrating an example application of reference picture resampling (RPR) 100. RPR is a new mechanism in VVC where pictures in the reference lists can be stored at a different resolution from the current picture and then resampled in order to perform regular decoding operations. The inclusion of this technique supports interesting application scenarios such as real-time communication with adaptive resolution, adaptive streaming with open group of pictures (GOP) structures. As shown in FIG. 1, a down-sampled (a.k.a., downsampled, or down sampled) sequence is encoded and then the reconstruction is up-sampled (a.k.a., upsampled, or up sampled) after decoding.

Commonly used or traditional up-sampling technology is discussed. In VTM 11.0, the up-sampling filter is a discrete cosine transform (DCT)-Based Interpolation Filter (DC-TIF). Besides that, bi-cubic interpolation and bi-linear interpolation are also commonly used. In these technologies, the weight coefficients for the interpolation filter are fixed once the number of taps of filters is given. Thus, the weight coefficients of these methods may be not the optimal.

Figure 2:
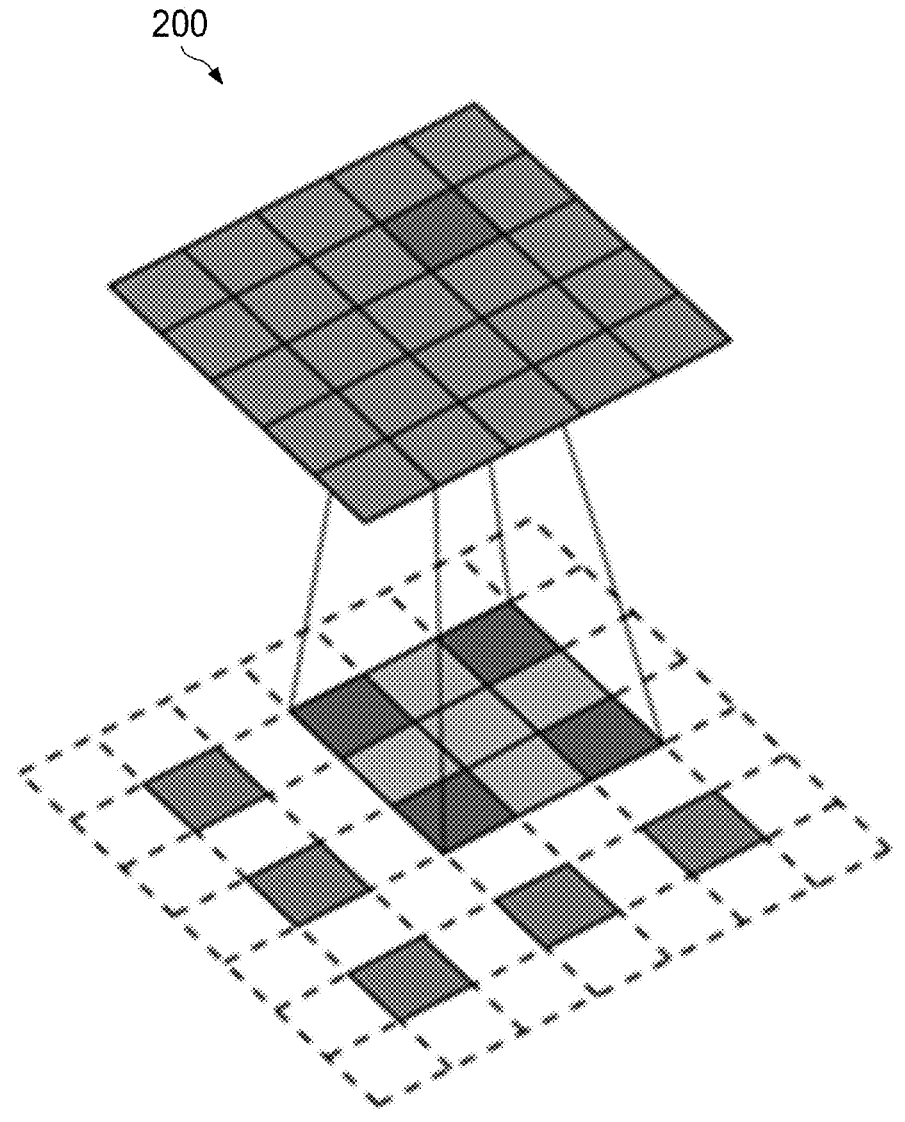
FIG. 2 is a schematic diagram illustrating an example of de-convolution.

FIG. 2 is a schematic diagram illustrating an example of de-convolution 200. De-convolution, which is also referred to as transposed convolution, is usually used for up-sampling in deep learning. In this method, the stride for convolution is the same as the scaling ratio. The bottom matrix is the low-resolution input where white blocks are the padded value with zeros and the gray blocks denote the original samples in low-resolution. The top matrix is the high-resolution output. In this example, the stride=2.

Figure 3:
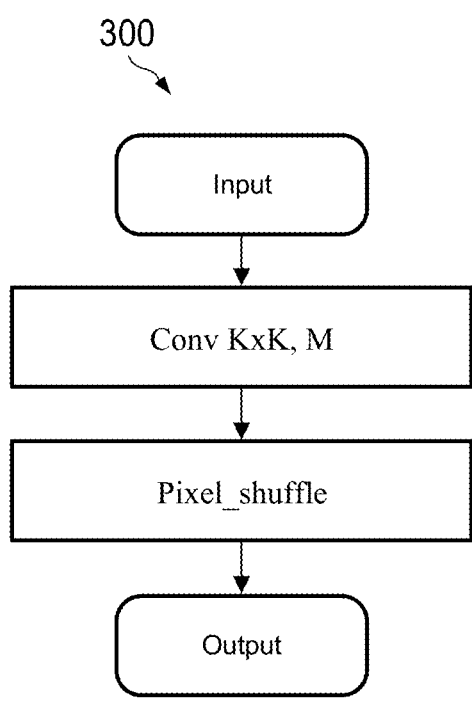
FIG. 3 is a schematic diagram illustrating an example of a process of pixel shuffle-based up-sampling.

FIG. 3 is a schematic diagram illustrating an example of a process of pixel shuffle-based up-sampling 300. The pixel shuffle layer is described in W. Shi, J. Caballero, et al., "Real-Time Single Image and Video Super-Resolution Using an Efficient Sub-Pixel Convolutional Neural Network," Proceedings of the IEEE conference on computer vision and pattern recognition, 2016. The pixel shuffle layer is another method for up-sampling used in deep learning. As shown in FIG. 3, the pixel shuffle is usually placed after a convolutional layer. The number of filters of this convolution is $M=C_{out}r^2$, where $C_{out}$ is the number of output channels and r denotes the up-scaling ratio. For example, given a low-resolution input with the size of H×W×3, when the size of high-resolution output is 2H×2W×3, then the number of filters $M=3\times2^2=12$. The pixel shuffle technique is described in further detail with regard to FIGS. 9-10, below.

Convolutional Neural network-based super resolution for video coding is discussed. Super-resolution (SR) is the process of recovering high-resolution (HR) images from low-resolution (LR) images. SR may also be referred to as up-sampling. In deep learning, a convolutional neural network (a.k.a., CNN or ConvNet) is a class of deep neural networks commonly applied to analyzing visual imagery. CNNs have very successful applications in image and video recognition/processing, recommender systems, image classification, medical image analysis, natural language processing.

CNNs are regularized versions of multilayer perceptrons. Multilayer perceptrons usually mean fully connected networks, that is, each neuron in one layer is connected to all neurons in the next layer. The "fully-connectedness" of these networks makes them prone to overfitting data. Typical ways of regularization include adding some form of magnitude measurement of weights to the loss function. CNNs take a different approach towards regularization. That is, CNNs take advantage of the hierarchical pattern in data and assemble more complex patterns using smaller and simpler patterns. Therefore, on the scale of connectedness and complexity, CNNs are on the lower extreme.

CNNs use relatively little pre-processing compared to other image classification/processing algorithms. This means that the network learns the filters that in traditional algorithms were hand-engineered. This independence from prior knowledge and human effort in feature design is a major advantage.

Deep learning for image/video coding is discussed. Deep learning-based image/video compression typically has two implications: end-to-end compression purely based on neural networks (NNs) and traditional frameworks enhanced by neural networks. The first type usually takes an auto-encoder like structure, either achieved by convolutional neural networks or recurrent neural networks. While purely relying on neural networks for image/video compression can avoid any manual optimizations or hand-crafted designs, compression efficiency may be not satisfactory. Therefore, works distributed in the second type take neural networks as an auxiliary, and enhance traditional compression frameworks by replacing or enhancing some modules. In this way, they can inherit the merits of the highly optimized traditional frameworks.

CNN-based super resolution is discussed in further detail. In lossy image/video compression, the reconstructed frame is an approximation of the original frame, since the quantization process is not invertible and thus incurs distortion to the reconstructed frame. In the context of RPR, the input image/video may be down-sampled. Thus, the resolution of original frame is 2× of that of reconstruction. To up-sample the low-resolution reconstruction, a convolutional neural network could be trained to learn the mapping from the distorted low-resolution frame to the original high-resolution frame. In practice, training must be performed prior to deploying the NN-based in-loop filtering. For example, see the CNN-based block up-sampling method for HEVC proposed in J. Lin, et al., "Convolutional Neural Network-Based Block Up-Sampling for HEVC," TCSVT 2019. For each coding tree unit (CTU) block, the method determines whether to use a down/up-sampling based method or the full-resolution based coding.

Training is discussed. The purpose of the training processing is to find the optimal value of parameters including weights and bias. First, a codec (e.g., the HEVC test model (HM), Joint Exploration Model (JEM), VTM, etc.) is used to compress the training dataset to generate the distorted reconstruction frames.

The reconstructed frames (low-resolution and compressed) are then fed into the NN and the cost is calculated using the output of NN and the ground-truth frames (a.k.a., original frames). Commonly used cost functions include Sum of Absolution Difference (SAD) and Mean Square Error (MSE). Next, the gradient of the cost with respect to each parameter is derived through the back propagation algorithm. With the gradients, the values of the parameters can be updated. The above process repeats until the convergence criteria is met. After completing the training, the derived optimal parameters are saved for use in the inference stage.

The convolution process is discussed. During convolution, the filter is moved across the image from left to right, top to bottom, with a one-pixel column change on the horizontal movements, then a one-pixel row change on the vertical movements. The amount of movement between applications of the filter to the input image is referred to as the stride. The stride is almost always symmetrical in height and width dimensions. The default stride or strides in two dimensions is (1,1) for the height and the width movement.

Figure 4:
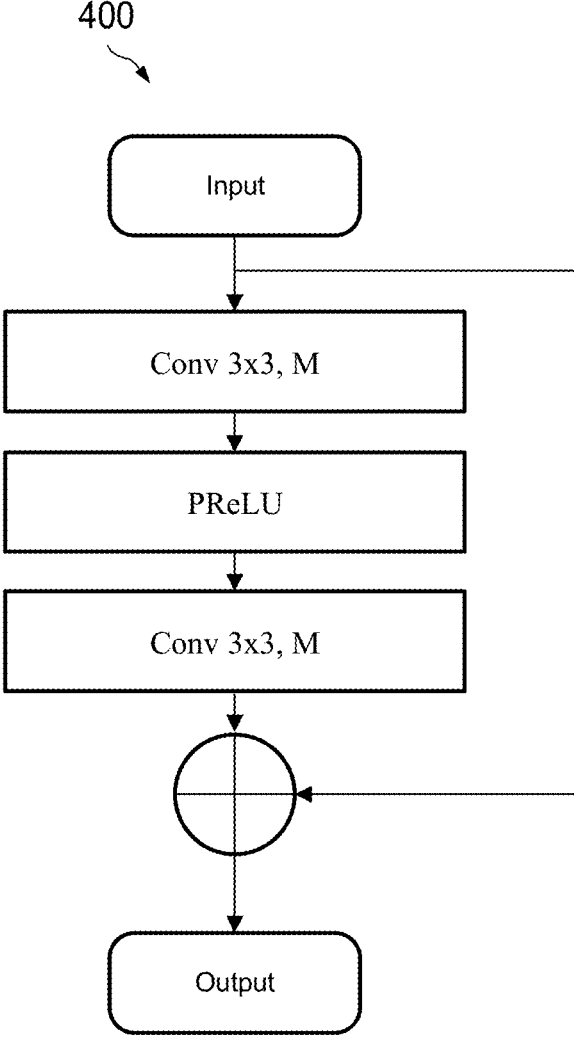
FIG. 4 is a schematic diagram illustrating an example of obtaining residual blocks, where M denotes the number of filters.

In most of deep convolutional neural networks, residual blocks are utilized as the basic module and stacked several times to construct the final network. FIG. 5 is a schematic diagram illustrating an example of obtaining residual blocks 500, where M denotes the number of filters. As shown in the example of FIG. 5, the residual block is obtained by combining a convolutional layer, a rectified linear unit (ReLU)/ parametric rectified linear unit (PReLU) activation function, and a convolutional layer as shown in FIG. 4.

Interference is discussed. During the inference stage, the distorted reconstruction frames are fed into NN and processed by the NN model whose parameters are already determined in the training stage. The input samples to the NN can be reconstructed samples before or after deblocking (DB), or reconstructed samples before or after sample adaptive offset (SAO), or reconstructed samples before or after adaptive loop filter (ALF).

Unfortunately, the existing NN-based super resolution for video coding has problems or drawbacks. For example, existing super resolution designs are usually placed after the in-loop filters. However, other locations could also be utilized such as in-between two in-loop filters (e.g., DBF, SAO, and ALF) or at the beginning of the in-loop filters.

Disclosed herein are techniques that apply a super resolution (SR) process to a video unit at a specific position relative to one or more in-loop filters when the one or more in-loop filters are applied to the video unit. In an embodiment, the specific position is a location of the SR process within an overall video coding process. That is, the specific position identified where, in a sequential order of operations, the SR process is applied relative to in-loop filters. Such in-loop filters may be, for example, a DBF, an SAO, and an ALF. The techniques can be used by video and image encoding, decoding, streaming and storing implementations. Thus, the video coding process is improved relative to conventional video coding techniques.

To solve the above problems and some other problems not mentioned, methods as summarized below are disclosed. The detailed embodiments below should be considered as examples to explain general concepts. These embodiments should not be interpreted in a narrow way. Furthermore, these embodiments can be applied individually or combined in any manner In the present disclosure, an NN-based SR can be any kind of NN-based methods, such as a convolutional neural network (CNN) based SR. In the following discussion, an NN-based SR may also be referred to as a non-CNN-based method, e.g., using machine learning based solutions.

In the following discussion, a video unit (a.k.a., video data unit) may be a sequence of pictures, a picture, a slice, a tile, a brick, a subpicture, a CTU/coding tree block (CTB), a CTU/CTB row, one or multiple coding units (CUs)/coding blocks (CBs), one or multiple CTUs/CTBs, one or multiple Virtual Pipeline Data Unit (VPDU), a sub-region within a picture/slice/tile/brick. In some embodiments, the video unit may be referred to as a video data unit.

Example 1

This example involves the position of SR. FIGS. 5A-5D are schematic diagrams illustrating examples of different positions for up-sampling 500.

Figure 5A:
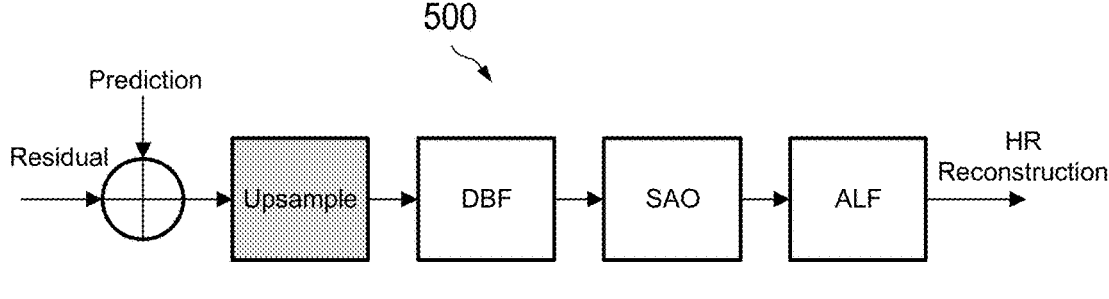
FIGS. 5A-5D are schematic diagrams illustrating examples of different positions for up-sampling.
Figure 5B:
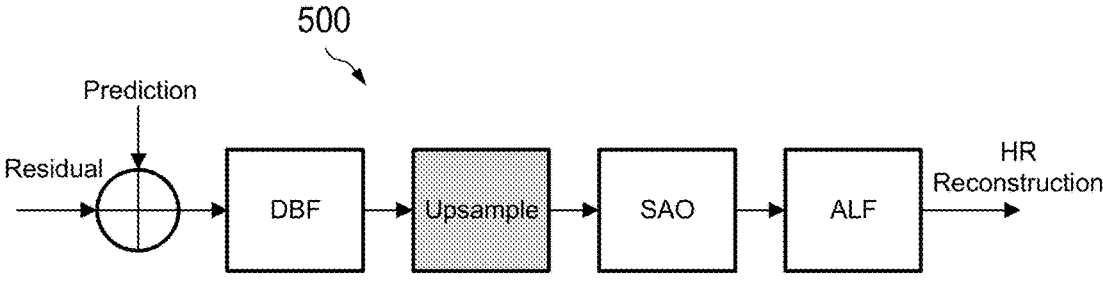
Figure 5C:
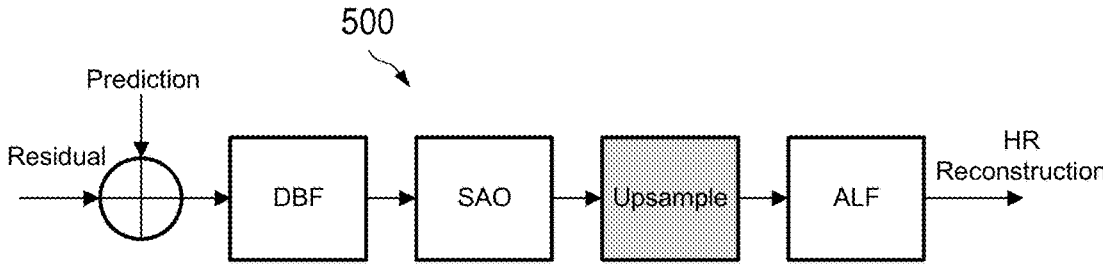
Figure 5D:
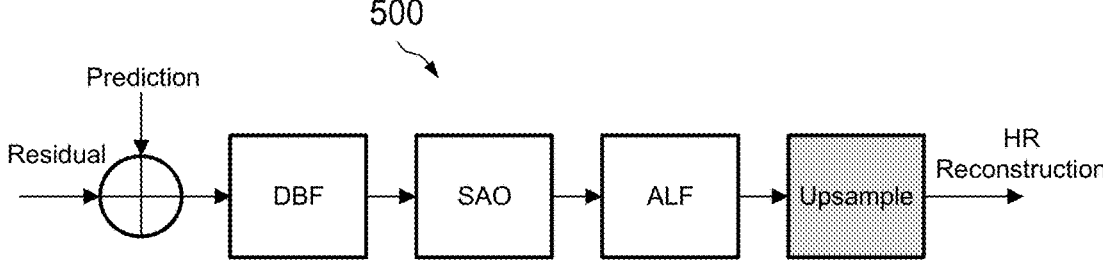

1. The super resolution (SR) process such as NN-based or Non-NN-based SR process may be placed before in-loop filters.
   a. In one example, the SR process may be invoked right after a block (e.g., a CTU/CTB) is reconstructed.
   b. In one example, the SR process may be invoked right after a region (e.g., a CTU row) is reconstructed.
2. The super resolution (SR) process such as NN-based or Non-NN-based SR process may be placed in different locations in the chain of in-loop filters.
   a. In one example, the SR process may be applied before or after a given in-loop filters.

i. In one example, the SR process is placed before the deblocking filter (DBF) as illustrated in FIG. 5A.
   ii. In one example, the SR process is placed between DBF and SAO as illustrated in FIG. 5B.
   iii. In one example, the SR process is placed between SAO and ALF as illustrated in FIG. 5C.
   iv. In one example, the super resolution is placed after ALF as illustrated in FIG. 5D.
   v. In one example, the SR process is placed before SAO.
   vi. In one example, the SR process is placed before ALF.
   b. In one example, whether to apply SR before a given in-loop filter may depend on whether the loop-filter decision process is taking the original image into consideration.
3. Indication of the position of SR process may be signaled in the bitstream or determined on-the-fly according to decoded information.
4. The SR process such as NN-based or Non-NN-based SR process may be exclusively used with other coding tools such as in-loop filters, i.e., when the SR process is applied, then one or multiple kinds of the in-loop filters may not be applied any more, or vice versa.
   a. In one example, the SR process may be used exclusively with at least one kind of in-loop filters.
   i. In one example, the original loop filters, such as DB, SAO, and ALF are all turned off when the SR process is applied.
   ii. In one example, the SR process may be applied when ALF is disabled.
   iii. In one example, the SR process may be applied to chroma components when CC-ALF is disabled.
   b. In one example, signaling of side information of an in-loop filtering method may be dependent on whether/how the SR process is applied.
   c. In one example, whether/how the SR process is applied may be dependent on the usage of an in-loop filtering method.

Example 2

Figure 7:
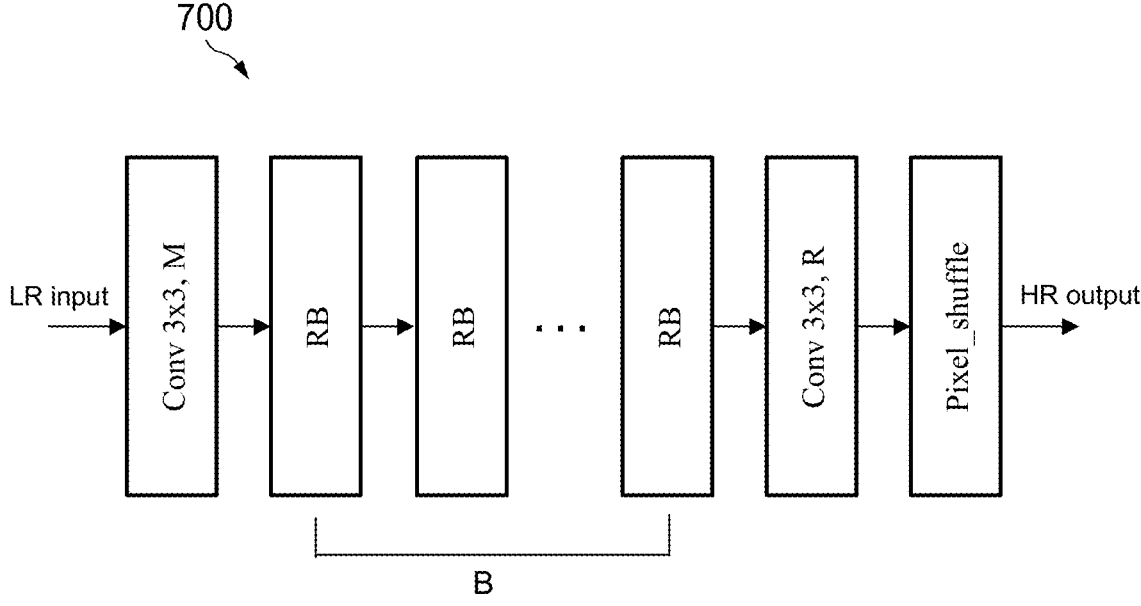
FIG. 7 is a schematic diagram of an example for an up-sampling network.

This example involves the SR network structure.
5. The proposed NN-based (e.g., CNN-based) SR network comprises multiple convolutional layers. There is an up-sampling layer used in the proposed network to up-sample the resolution.
   a. In one example, the de-convolution with stride of K greater than 1 (e.g. K=2) can be used for up-sampling.
   i. In one example, K may be dependent on decoded information (E.g., color format).
   b. In one example, the pixel shuffling is used for up-sampling as shown in FIG. 7. FIG. 7 is a schematic diagram of an example for an up-sampling network 700. Suppose the down-sampling ratio is K where the resolution of LR input is 1/K of the original input. The first 3×3 convolution is used to fuse the information from LR input and generate the feature maps. The output feature maps from the first convolutional layer then go through several sequentially stacked residual blocks, each labeled RB. Feature maps are labeled M and R. The last convolutional layer takes the feature maps from the last residual block as input and produces R (e.g., R=K*K) feature maps. Finally, a shuffle layer is adopted to generate the filter image whose spatial resolution is the same with the original resolution.
   c. In one example, the residual blocks may be used in the SR network. In one example, the residual blocks consists of three sequentially connected components as shown in FIG. 4: one convolutional layer, one PReLU activation function, and a convolutional layer. The input to the first convolutional layer is added to the output of the second convolutional layer.

6. The inputs of the NN-based (e.g. CNN-based) SR network can be different video units (e.g., sequence/picture/slice/tile/brick/subpicture/CTU/CTU row/one or multiple CUs or CTUs/CTBs, or any rectangular region) levels.

a. In one example, the input of SR network can be a CTU block which is down-sampled.

b. In one example, the input is the whole frame which is down-sampled.

7. The input of NN-based (e.g. CNN-based) SR network may be a combination of different color components.

a. In one example, the input may be the luma component of reconstruction.

b. In one example, the input may be the chroma components of reconstruction.

c. In one example, the input may be both luma and chroma components of the same reconstruction.

8. In one example, the luma component may be used as the input and the output of the NN-based (e.g. CNN-based) SR network is the up-sampled chroma components.

9. In one example, the chroma components may be used as the input and the output of the NN-based (e.g. CNN-based) SR network is the up-sampled luma component.

10. The NN-based (e.g. CNN-based) SR network is not limited to up-sample the reconstructions.

a. In one example, the decoded side information may be used as the input of NN-based (e.g. CNN-based) SR network for up-sampling.

i. In one example, the prediction picture may be used as the input for up-sampling. The output of the network is the up-sampled prediction picture.

Example 3

1. It is proposed that for two sub-regions within a video unit (e.g., a picture/slice/tile/subpicture), two different SR methods may be applied.

a. In one example, the SR methods may include the NN-based solution.

b. In one example, the SR methods may include the non-NN-based solution (e.g., via the traditional filters).

c. In one example, for a first sub-region, the NN-based solution is used, and for a second sub-region, the non-NN-based solution is used.

d. In one example, for a first sub-region, the NN-based solution with a first design/model is used, and for a second sub-region, the NN-based solution with a second design/model is used.

i. In one example, the first/second design may have different inputs.

ii. In one example, the first/second design may have different number of layers.

iii. In one example, the first/second design may have different strides.

e. In one example, indications of the allowed SR methods and/or which SR method to be used for a sub-region may be signaled in the bitstream or derived on-the-fly.

i. In one example, the indication may be derived according to decoded information (e.g., how many/ratio of samples are intra coded).

ii. In one example, the indication may be derived according to the SR solution used for a reference sub-region (e.g., co-located sub-region).

2. A candidate set for a video unit may be pre-defined or signaled in the bitstream wherein the candidate set may include multiple SR solutions for samples in the video unit to be chosen from.

a. In one example, the candidate set may include multiple NN-based methods with different models/designs.

b. In one example, the candidate set may include NN-based methods and non-NN-based methods.

c. In one example, different candidate sets of NN-based SR models are used for different cases, e.g., according to decoded information.

i. In one example, there are different sets of NN-based SR models corresponding to different color components, and/or different slice types, and/or different quantization parameters (QPs).

1. In one example, QP may be categorized into several groups. For example, different NN-based SR models may be used for different group [QP/M], wherein M is an integer such as 6.

2. In one example, the QP is fed into the SR model where one model can correspond to all the QPs. In this condition, only one QP group is used.

ii. In one example, luma component and chroma component may adopt different sets of NN-based SR models.

1. In one example, a first set of NN-based SR models is applied to luma component, and a second set of NN-based SR models is applied to at least one chroma components.

2. In one example, each color components is associated with its own set of NN-based SR models.

3. Alternatively, furthermore, how many sets of NN-based SR models to be applied for the three-color components may depend on the slice/picture types, and/or partitioning tree types (single or dual tree), etc.

iii. In one example, two slice types (e.g., I slice and B (or P) slice) may utilize different sets of NN-based SR models.

iv. In one example, for a first color component, two slice types (e.g., I slice and B (or P) slice) may utilize different sets of NN-based SR models; while for a second color component, two slice types (e.g., I slice and B (or P) slice) may utilize same set of NN-based SR models.

v. In one example, for each QP or QP group, one NN-based SR model is trained. The number of NN models is equal to the number of QPs or QP groups.

3. In one example, the NN-based (e.g. CNN-based) SR and the traditional filters can be used together.

a. In one example, for different video units (e.g., sequence/picture/slice/tile/brick/subpicture/CTU/CTU row/one or multiple CUs or CTUs/CTBs) level, different up-sampling can be used together.

i. For example, for different CTUs in one picture, some CTUs may choose the traditional filters and other CTUs may prefer the NN-based SR methods.

b. In one example, the selection of NN-based SR and the traditional filters may be signaled from the encoder to the decoder.

i. The selection may be signaled in sequence header/sequence parameter set (SPS)/picture parameter set (PPS)/Picture header/Slice header/CTU/CTB, or any rectangular region.

ii. Different selection may be signaled for different color component.

4. In above examples, the traditional filters can be used as the up-sampling method.
   a. In one example, the DCT interpolation filter (DCTIF) can be used as the up-sampling method.
   b. In one example, the bilinear interpolation can be used as the up-sampling method.
   c. In one example, the bi-cubic interpolation can be used as the up-sampling method.
   d. In one example, the Lanczos interpolation can be used as the up-sampling method.
   e. In one example, the up-sampling method may be signaled from the encoder to the decoder.
   i. In one example, an index may be signaled to indicate the up-sampling filter.
   ii. In one example, at least one coefficient of the up-sampling filter may be signaled, directly or indirectly.
   iii. The up-sampling method may be signaled in sequence header/SPS/PPS/Picture header/Slice header/CTU/CTB, or any rectangular region.
   iv. Different up-sampling method may be signaled for different color component.
   f. In one example, the up-sampling method may be required by the decoder side and informed to the encoder side in an inter-active application.
5. In one example, a NN-based SR can be used as the up-sampling method.
   a. In one example, the network of the SR should include as least one up-sampling layer.
   i. In one example, the neural network may be CNN.
   ii. In one example, the de-convolution with a stride of K (e.g. K=2) may be used as the up-sampling layer, which is illustrated in FIG. 2.
   iii. In one example, the pixel shuffling method may be used as the up-sampling layer, which is illustrated in FIG. 3.
6. The NN-based (e.g. CNN-based) SR may be applied to certain slice/picture types, certain temporal layers, or certain slices/picture according to reference picture list information.

Example 4

This example involves the choice of up-sampling methods.
7. Whether and/or how to use NN-based (e.g. CNN-based) SR (denoted as CNN information) may depend on video standard profiles or levels.
8. Whether and/or how to use NN-based (e.g. CNN-based)SR (denoted as CNN information) may depend on color components.
9. Whether and/or how to use NN-based (e.g. CNN-based) SR (denoted as CNN information) may depend on picture/slice type.
10. Whether and/or how to use NN-based (e.g. CNN-based) SR (denoted as CNN information) may depend on the contents or coded information of a video unit.
   a. In one example, when the variances of the reconstruction samples are greater than a predefined threshold, NN-based SR will be used.
   b. In one example, when the energy of the high frequency components of the reconstruction samples is greater than a predefined threshold, NN-based SR will be used.
11. Whether and/or how to use NN-based (e.g. CNN-based) SR (denoted as CNN information) may be controlled at a video unit (e.g., sequence/picture/slice/tile/brick/subpicture/CTU/CTU row/one or multiple CUs or CTUs/CTBs) level.

a. CNN information may comprise one or more of the following.
   i. Indication of enabling/disabling the CNN filters.
   ii. Which kind of CNN filter is applied.
   iii. CNN filtering parameters.
   iv. CNN models.
   v. Stride for a convolutional layer.
   vi. Precision of CNN parameters.
   b. In one example, CNN information may be signaled in the video unit level.
   i. In one example, the CNN information may be signaled in sequence header/SPS/PPS/Picture header/Slice header/CTU/CTB, or any rectangular region.
12. The number of different CNN SR models and/or sets of CNN set models may be signaled to the decoder.
   a. The number of different CNN SR models and/or sets of CNN set models may be different for different color component.
13. In one example, a rate distortion optimization (RDO) strategy or a distortion-minimizing strategy is used to determine the up-sampling for one video unit.
   a. In one example, the different CNN-based SR models will be used to up-sample the current input (for example, luma reconstruction). Then the PSNR values between the up-sampled reconstructions by different CNN-based SR models and the corresponding original input (the one which is not down-sampled and compressed) are calculated. The model which achieves the highest PSNR value will be chosen as the model for up-sampling. The index of that model may be signaled.
   i. In one example, the Multi-Scale Structural Similarity (MS-SSIM) value instead of Peak Signal to Noise Ratio (PSNR) value is used as the metric.
   b. In one example, the different tradition up-sampling filters are compared and the one achieves best quality metric is chosen.
   i. In one example, the quality metric is PSNR.
   c. In one example, the different CNN-based SR models and traditional filters are compared and the one achieves best quality metric is chosen.
   i. In one example, the quality metric is PSNR.
   d. The determination may be performed at encoder or at decoder.
   i. If the determination is at decoder, the distortion may be calculated based on samples other than the current picture/slice//CTU/CTB, or any rectangular region.
14. Different quality metric can be used as metric.
   a. In one example, the quality metric is PSNR.
   b. In one example, the quality metric is SSIM.
   c. In one example, the quality metric is MS-SSIM.
   d. In one example, the quality metric is Video Multi-method Assessment Fusion (VMAF).

Example 5

This example involves down-sampling methods of SR-based video coding.
   1. In one example, the down-sampling method can be traditional filters.
   a. In one example, the Discrete Cosine Transform Interpolation Filter (DCTIF) can be used for down-sampling.
   b. In one example, the bilinear interpolation can be used for down-sampling.
   c. In one example, the bicubic interpolation can be used for down-sampling.

d. In one example, the down-sampling method may be signaled from the encoder to the decoder.

i. In one example, an index may be signaled to indicate the down-sampling filter.

ii. In one example, at least one coefficient of the down-sampling filter may be signaled, directly or indirectly.

iii. The down-sampling method may be signaled in sequence header/SPS/PPS/Picture header/Slice header/CTU/CTB, or any rectangular region.

iv. Different down-sampling method may be signaled for different color component.

e. In one example, the down-sampling method may be required by the decoder side and informed to the encoder side in an inter-active application.

Figure 6:
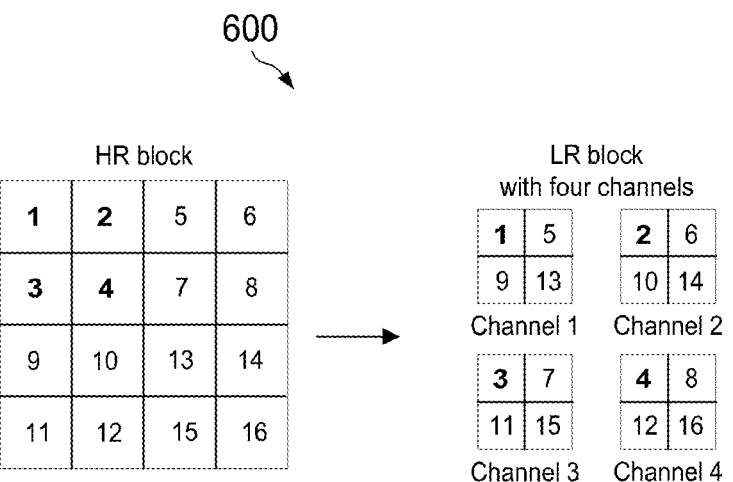
FIG. 6 is a schematic diagram of an example of an inverse process of the pixel shuffle.

2. In one example, the down-sampling method can be neural network (NN) based such as convolutional neural network (CNN) based, method.

a. The CNN-based down-sampling method should include at least one down-sampling layer.

i. In one example, the convolution with stride of K (e.g. K=2) can be used as the down-sampling layer and the down-sampling ratio is K.

ii. In one example, the pixel-unshuffling method followed by a convolution with stride of 1 can be used for down-sampling. The pixel-unshuffling is illustrated in FIG. 6. FIG. 6 is a schematic diagram of an example of an inverse process of the pixel shuffle 600. In an embodiment, the inverse process of the pixel shuffle has a down-sampling ratio of 2.

3. A series of down-sampling can be used for achieving a specific down-sampling ratio.

a. In one example, two convolutional layers with stride of K (e.g., K=2) is used in one network. In this condition, the down-sampling ratio is 4.

b. In one example, two traditional down-sampling filters (down-sampling ratio of each is 2) are used for a down-sampling ratio of 4.

4. In one example, the traditional filters and the CNN-based methods can be combined for a specific down-sampling ratio.

a. In one example, the traditional filters is used followed by a CNN-based method. The traditional filter achieves 2× down-sampling and the CNN-based method achieves 2× down-sampling. Thus, the input is down-sampled by 4×.

5. When down-sample a specific input video unit level, Different down-sampling methods may be compared with each other to choose a best down-sampling method.

a. In one example, there are K (e.g. K=3) CNN-based down-sampling models. For one specific input, the three down-sampling models will down-sample the input, respectively. The down-sampled reconstruction will be up-sampled to the original resolution. The quality metric (e.g., PSNR) is utilized to measure the three up-sampled results. The model who achieves the best performance will be utilized to the real down-sampling.

i. In one example, the quality metric is MS-SSIM.

ii. In one example, the quality metric is PSNR.

b. The index of the down-sampling methods may be signaled to the encoder or decoder.

6. The down-sampling methods may be signaled to the decoder.

a. In one example, the CNN-based down-sampling methods are used for down-sampling. For one specific video unit (e.g. frame) level, the index of chosen model will be signaled to the decoder.

b. In one example, different CTUs within one frame use different down-sampling methods. In this condition, all the index of the corresponding methods may be signaled to the decoder.

c. In one example, at least one coefficient of the down-sampling filter may be signaled, directly or indirectly.

d. Different down-sampling method may be signaled for different color component.

e. In one example, the down-sampling method may be required by the decoder side and informed to the encoder side in an inter-active application.

Example 6

This example discusses the down-sampling ratio of input.

7. The input of down-sampling methods can be at all the video unit (e.g., sequence/picture/slice/tile/brick/sub-picture/CTU/CTU row/one or multiple CUs or CTUs/CTBs) level.

a. In one example, the input is the frame level with size of its original resolution.

b. In one example, the input is one CTU level with size of 128×128.

8. In one example, the input is a block within one frame whose size is not limited.

c. In one example, the input can be a block with spatial size (M, N), for example, M=256, N=128.

9. In one example, the down-sampling ratio can be different for all the video unit (e.g., sequence/picture/slice/tile/brick/subpicture/CTU/CTU row/one or multiple CUs or CTUs/CTBs) level.

d. In one example, the down-sample ratio is 2 for all the frames of one sequence.

e. In one example, the down-sample ratio is 2 for all the CTUs of one frame.

f. In one example, the down-sample ratio is 2 for the first frame and it may be 4 for the next frame.

g. The combination of down-sampling ratio for different video unit levels may be used.

i. In one example, the down-sample ratio is 2 for one frame and it may be 4 for one CTU in the same frame. In the condition, the CTU will be down-sampled by 4×.

10. In one example, the down-sampling ratio can be different for all the components of the input video unit level.

h. In one example, the down-sampling ratio is 2 for both luma and chroma components.

i. In another example, the down-sampling ratio is 2 for luma component and it is 4 for chroma components.

11. In one example, the down-sampling ratio can be 1 which means no down-sampling is performed.

j. The down-sampling ratio can be applied at all the video unit (e.g., sequence/picture/slice/tile/brick/subpicture/CTU/CTU row/one or multiple CUs or CTUs/CTBs) level.

12. The down-sampling ratio can be determined by comparison.

k. In one example, there are 2× and 4× down-sampling ratio for one frame can be used. In this condition, the encoder may compress a video unit with 2× down-sampling and then compressed the video unit with 4× down-sampling. After that, then up-sample the low-resolution reconstruction with the same up-sampling method. Then calculate the quality metric (e.g., PSNR) of each results. The down-sampling ratio which achieves the best reconstruction quality will be chosen as the real down-sampling ratio for compression.

i. In one example, the quality metric is MS-SSIM.

13. The determination may be performed at encoder or at decoder.

ii. If the determination is at decoder, the distortion may be calculated based on samples other than the current picture/slice//CTU/CTB, or any rectangular region.

14. Different quality metric can be used as metric for the comparison.

e. In one example, the quality metric is PSNR.

f. In one example, the quality metric is SSIM.

g. In one example, the quality metric is MS-SSIM.

h. In one example, the quality metric is VMAF.

15. In one example, the down-sampling ratio may be signaled in the video unit level.

l. In one example, the CNN information may be signaled in SPS/PPS/Picture header/Slice header/CTU/CTB.

Example 7

1. It is proposed that the coded (encoded/decoded) information can be utilized during the super resolution process.

a. In one example, the coded information could be used as inputs to NN-based SR solutions.

b. In one example, the coded information could be used to determine which SR solution to be applied.

c. In one example, the coded information may include the partition information, the prediction information, and the intra prediction mode, etc.

i. In one example, the input includes the reconstructed low-resolution samples and other decoded information (e.g., the partition information, the prediction information, and the intra prediction mode).

ii. In one example, the partition information has the same resolution as the reconstructed low-resolution frame. Sample values in the partition information are derived by averaging the reconstructed samples in a coding unit.

iii. In one example, the prediction information may be the generated prediction samples from intra prediction or IBC prediction or inter-prediction.

iv. In one example, the intra prediction mode has the same resolution as the reconstructed low-resolution frame. Sample values in the intra prediction mode are derived by filling the intra prediction mode in the corresponding coding unit.

v. In one example, the QP value information can be used as assistant information to improve the quality of up-sampled reconstruction.

1. In one example, construct a QP map by filling a matrix with QP value and its spatial size is the same with other input data. The QP map will be fed into the network of super resolution.

Example 8

This example involves the color components for input of the SR network.

2. Information related to a first color component may be utilized during the SR process applied to a second color component.

a. Information related to a first color component may be utilized as input for the SR process applied to a second color component.

b. Chroma information may be utilized as input for luma up-sampling process.

c. Luma information may be utilized as input for chroma up-sampling process.

i. In one example, the luma reconstructed samples before the in-loop filters may be used.

1. Alternatively, the luma reconstructed samples after the in-loop filters may be used.

ii. In one example, the input to the NN contains both chroma reconstructed samples and luma reconstructed samples.

1. In one example, the luma information can be down sampled to the same resolution with chroma components. The down-sampled luma information will be concatenated with the chroma components.

a. In one example, the down-sample method is bi-linear interpolation.

b. In one example, the down-sample method is bi-cubic interpolation.

c. In one example, the down-sample method is convolution with stride equal to the scaling ratio for original frame.

d. In one example, the down-sample method is the inverse of pixel shuffle, which is illustrated in FIG. 6. A high-resolution block (HR block) with size 4×4×1 will be down-sampled to a low-resolution block (LR block) with size 2×2×4. The font of first element in each channel of the LR block and the corresponding position in the HR block are bold.

e. In one example, the down-sample method may depend on color format such as 4:2:0 or 4:2:2.

f. In one example, the down-sample method may be signaled from the encoder to the decoder.

g. Alternatively, furthermore, whether to apply the down-sample process may depend on the color format.

2. In another example, the color format is 4:4:4 and no down-sampling is performed to the luma information.

iii. In one example, the chroma reconstructed samples before the in-loop filters may be used.

1. Alternatively, the chroma reconstructed samples after the in-loop filters may be used.

iv. In one example, the input to the NN contains both chroma reconstructed samples and luma reconstructed samples.

v. In one example, the input to the NN contains both chroma reconstructed samples and luma prediction samples.

d. In one example, one chroma component (e.g., Cb) information may be utilized as input for the other chroma component (e.g., Cr) up-sampling process.

e. In one example, the input includes the reconstructed samples and the decoded information (e.g., the mode information, and the prediction information).

i. In one example, the mode information is a binary frame with each value indicating if the sample belongs to a skip coded unit or not.

ii. In one example, the prediction information is derived via the motion compensation for inter coded coding unit.

3. In one example, the prediction information may be utilized as input for the SR process applied to the reconstruction.

a. In one example, the luma information of prediction pictures may be utilized as input for the SR process of the luma component of reconstructions.

b. In one example, the luma information of prediction pictures may be utilized as input for the SR process of the chroma component of reconstructions.

c. In one example, the chroma information of prediction pictures may be utilized as input for the SR process of the chroma component of reconstructions.

d. In one example, the luma and chroma information of prediction pictures may be utilized together as input for the SR process of the reconstruction (for example, luma reconstruction).

e. In case prediction information is unavailable (such as the coding mode is palette or PCM), the prediction samples are padded.

4. In one example, the partition information may be utilized as input for the SR process applied to the reconstruction.

a. In one example, the partition information has the same resolution as the reconstructed low-resolution frame. Sample values in the partition are derived by averaging the reconstructed samples in a coding unit.

5. In one example, the intra prediction mode information may be utilized as input for the SR process applied to the reconstruction.

a. In one example, the intra prediction mode of current sample via intra or inter prediction can be used.

i. In one example, the intra prediction mode matrix, which is the same resolution as the reconstruction, is constructed as one input for the SR process. For each sample in the intra prediction mode matrix, the value comes from the intra prediction mode of the corresponding CU.

Example 9

This example involves general solutions.

6. In one example, the above method may be applied to a specific picture/slice type, such as I slice/pictures, e.g., a NN-based SR model is trained to up-sample the reconstructed samples in I slice.

7. In one example, the above method may be applied to B/P slice/pictures, e.g., a NN-based SR model is trained to up-sample the reconstructed samples in B slice or P slice.

Example 10

This example involves the processing unit of SR.

1. Super resolution/up-sampling process may be performed at an SR unit level wherein the SR unit covers more than one sample/pixel.

a. In one example, the SR unit may be the same as the video unit wherein down-sampling process is invoked.

b. In one example, the SR unit may be different from the video unit wherein down-sampling process is invoked.

i. In one example, even the down-sampling is performed in the picture/slice/tile level, the SR unit may be a block (e.g., a CTU).

ii. In one example, even the down-sampling is performed in the CTU/CTB level, the SR unit may be CTU row or multiple CTU/CTBs.

c. Alternatively, furthermore, for the NN-based SR methods, the inputs to the network may be set to the SR unit.

d. Alternatively, furthermore, for the NN-based SR methods, the inputs to the network may be set to a region containing the SR unit to be up-sampled and other samples/pixels.

e. In one example, the SR unit may be indicated in a bitstream or pre-defined.

2. For two SR units, the super resolution methods/up-sampling methods may be different.

a. In one example, the super resolution methods/up-sampling methods may include the NN-based solution and the non-NN-based solution (e.g., traditional up-sampling filtering methods).

3. The inputs of SR network can be at different video units (e.g., sequence/picture/slice/tile/brick/subpicture/CTU/CTU row/one or multiple CUs or CTUs/CTBs, or any region covers more than one sample/pixel) level.

a. In one example, the input of SR network can be a CTU block which is down-sampled.

b. In one example, the input is the whole frame which is down-sampled.

4. The CNN-based SR models can be used to up-sample the different video unit level.

a. In one example, the CNN-based SR models are trained on the frame-level data and is used to up-sample the frame-level input.

b. In one example, the CNN-based SR models are trained on the frame-level data and is used to up-sample the CTU-level input.

c. In one example, the CNN-based SR models are trained on the CTU-level data and is used to up-sample the frame-level input.

d. In one example, the CNN-based SR models are trained on the CTU-level data and is used to up-sample the CTU-level input.

Example 11

This example involves the side information for input of SR network.

5. The down-sampling ratio of a video unit may be treated as inputs of the SR network.

a. Alternatively, furthermore, the convolutional layer may be configured with a stride which is dependent on the down sampling ratio.

b. The down-sampling ratio for the input of SR network can be any positive integers.

i. Alternatively, furthermore, and the minimal spatial resolution of the input shall be 1×1.

c. The down-sampling ratio for the input of SR network may be a ratio of any two positive integers, such as 3:2.

d. The horizontal down-sampling ratio can vertical down-sampling ratio may be the same, or they may be different.

6. It is proposed that the encoded/decoded information can be utilized during the up-sampling process.

a. In one example, the encoded/decoded information may be used as the inputs of the super resolution network.

b. In one example, the encoded/decoded information may include but not limited to prediction signal, partition structure, intra prediction mode.

Other technical solutions are discussed.

Figure 8:
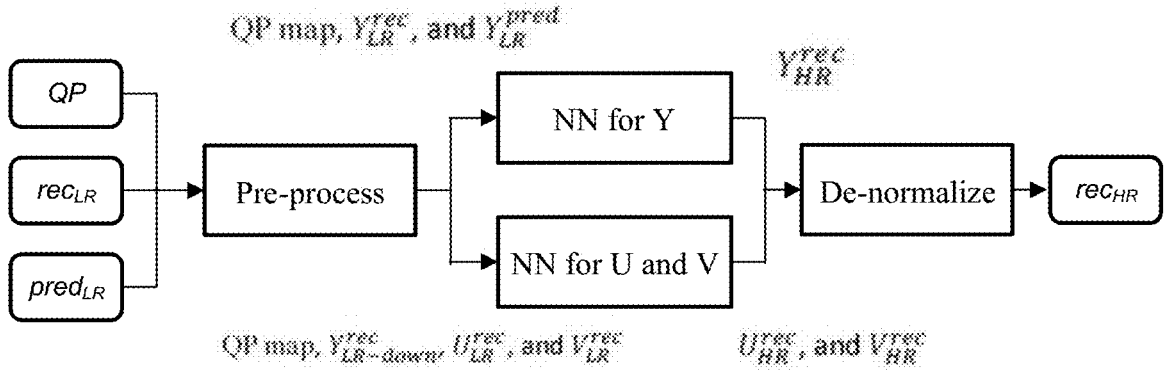
FIG. 8 is a schematic diagram of an overall framework for up-sampling according to an embodiment of the disclosure.

FIG. 8 is a schematic diagram of an overall framework for up-sampling 800 according to an embodiment of the disclosure. The preprocess will extract and normalize the QP value, Y, U, and V data from the reconstruction $rec_{LR}$ and the prediction $pred_{LR}$. The output of pre-processing is the normalized QP map and Y, U, and V data used for the up-sampling. A neural network based super resolution technology is utilized for up-sampling. In the present disclosure, two neural networks are used. One network is designed for the Y channel data and the other is designed for U and V channel data. The $$Y_{HR}^{rec}, U_{HR}^{rec}, \text{ and } V_{HR}^{rec}$$

are the up-sampled reconstruction data. The final up-sampled reconstruction is consisted of de-normalized $$Y_{HR}^{rec}, U_{HR}^{rec}, \text{ and } V_{HR}^{rec}.$$

The pre-processing before upsampling is discussed.
1. Normalize the reconstruction Y, U, and V channels, the prediction Y channel, and the base QP value. In one example, the equation for normalization is:

$$Y_{LR}^{rec}[i, j] = \frac{Y^{rec}[i, j]}{1023.0}$$

$$U_{LR}^{rec}[i, j] = \frac{U^{rec}[i, j]}{1023.0}$$

$$V_{LR}^{rec}[i, j] = \frac{V^{rec}[i, j]}{1023.0}$$

$$Y_{LR}^{pred}[i, j] = \frac{Y^{pred}[i, j]}{1023.0}$$

$$QP_{norm} = \frac{QP}{51.0}$$

where the [i, j] is the coordinate of a pixel in the frame, the $Y^{rec}$ denotes the Y channel of the reconstruction frame, the $U^{rec}$ denotes the U channel of the reconstruction frame, the $V^{rec}$ denotes the V channel of the reconstruction frame, and $Y^{pred}$ denotes the Y channel of the prediction frame.

Figure 9:
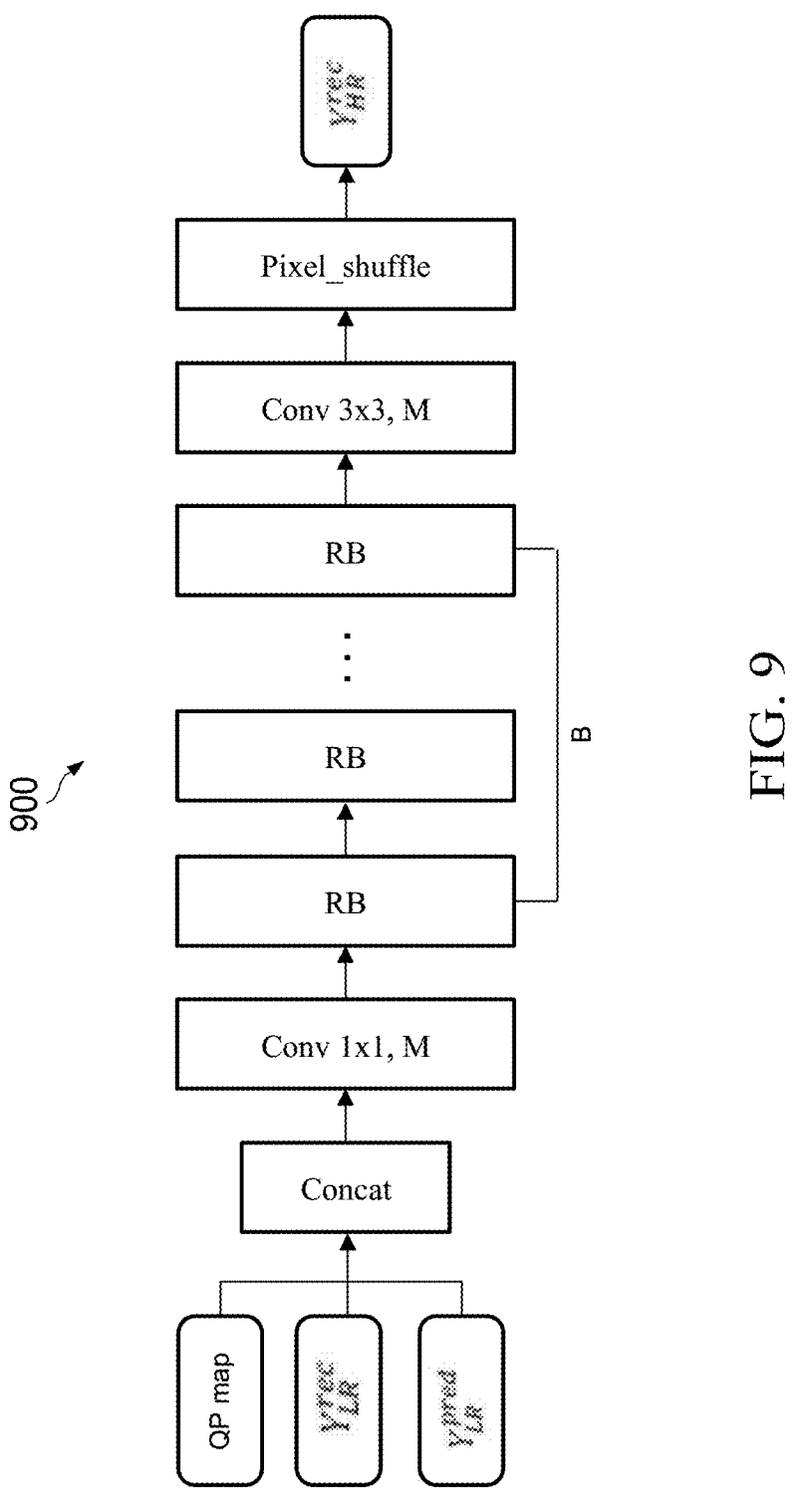
FIG. 9 is a schematic diagram of an example of a neural network (NN) for reconstruction of a Y channel.

Construct the QP map by filling a matrix with $QP_{norm}$ and the size of QP map should be the same with $$Y_{LR}^{rec}.$$

$$QP\_MAP[i,j]=QP_{norm}$$

where [i, j] is the coordinate of a pixel in the frame.
The up-sampling for Y channel is discussed.
Feed the QP_MAP, $$Y_{LR}^{pred}, \text{ and } Y_{LR}^{rec}$$

into the neural network designed for Y channel.
In one example, the neural network is illustrated in FIG. 9. FIG. 9 is a schematic diagram of an example of a NN for reconstruction of a Y channel 900. The term "Conv k×k, M" denotes the convolution with kernel size, k, and the number of filters is M. The term B is the number of residual blocks (RBs). The term R is the square of scaling ratio, r.
The input of network consists of three parts: QP map $$Y_{LR}^{rec}, \text{ and } Y_{LR}^{pred}.$$

Figure 10:
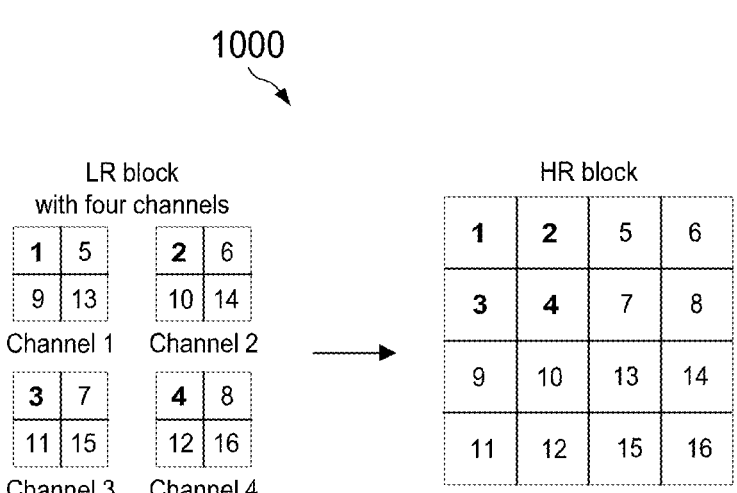
FIG. 10 is a schematic diagram of an example of a pixel shuffle operator.

The QP map is the base QP for compression and the $$Y_{LR}^{rec} \text{ and } Y_{LR}^{pred}$$

denote the low-resolution reconstruction frame and the corresponding low-resolution prediction frame, respectively. The $$Y_{HR}^{rec}$$

denotes the high-resolution output of neural network, which is the same resolution with the original frame. As shown in FIG. 8, the network is composed of residual blocks and a pixel shuffle layer for up-sampling.
In one example, residual blocks are shown in FIG. 4. In one example, the up-sampling block in FIG. 8 uses the pixel shuffle layer as illustrated in FIG. 10. FIG. 10 is a schematic diagram of an example of a pixel shuffle operator 1000. A low-resolution block (LR block) with size 2×2×4 is upsampled to a high-resolution block (HR block) with size 4×4×1. The font of the first element in each channel of the LR block and the corresponding position in the HR block are bold.
Alternatively, the up-sampling block can use the de-convolution with stride equal to the up-scaling ratio.
In another example, the body of neural network can be different, as long as it has one up-sampling layer before the output of neural network.
De-normalize the output of the neural network designed for Y channel data. In one example, the equation for de-normalizing is:

$$Y_{HR-denorm}^{rec}[i, j] = \lfloor 1023.0 * Y_{HR}^{rec}[i, j] + 0.5 \rfloor$$

where [i, j] is the coordinate of a pixel in the frame, $$Y_{HR}^{rec}$$

is the output of the neural network, and $\lfloor x \rfloor$ returns the floor of input x.
The following steps are used for up-sampling chroma components (U and V channels).
5. Down-sample the $$Y_{LR}^{rec}$$

to the same resolution with $$U_{LR}^{rec}.$$

Figure 11:
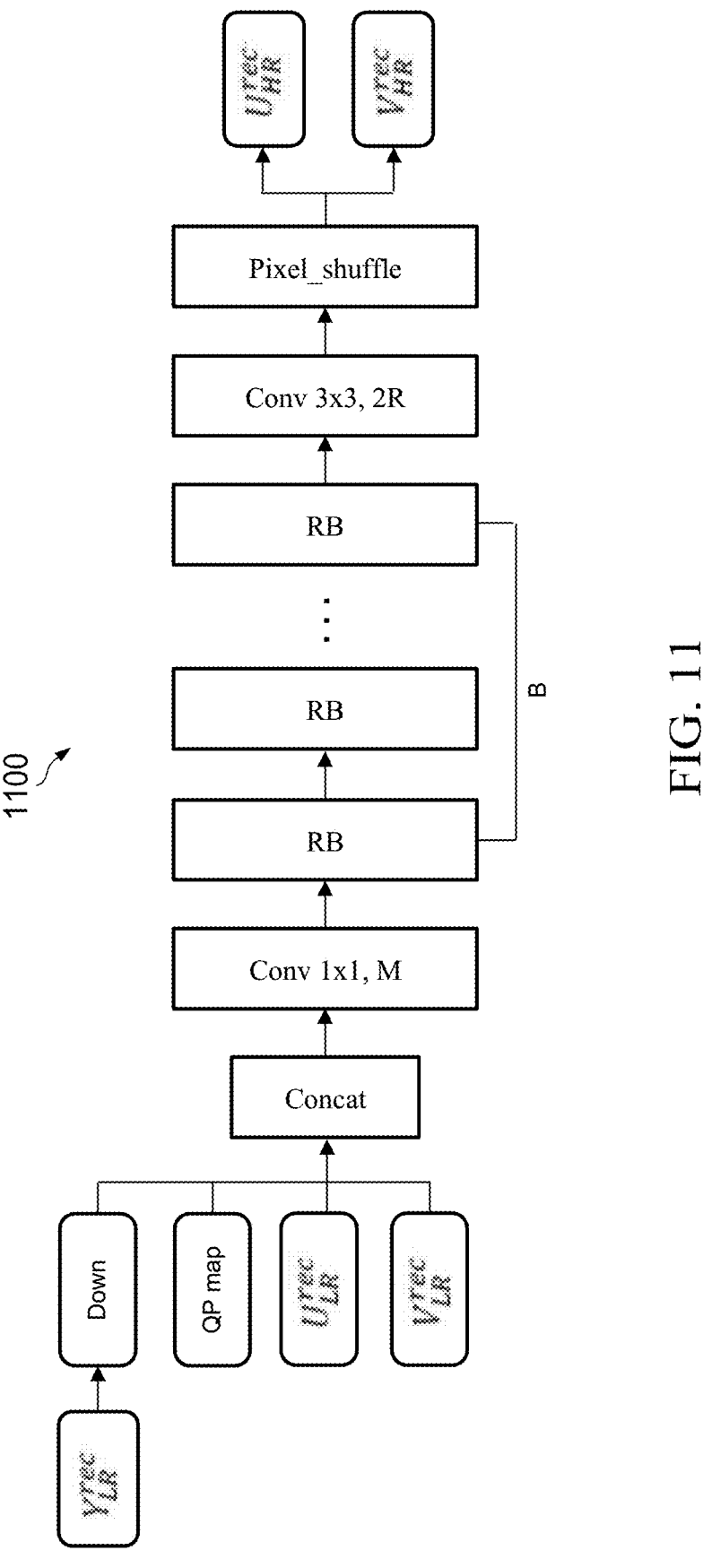
FIG. 11 is a schematic diagram of an example of a neural network for reconstruction of U and V channels.

The down-sampled $$Y_{LR}^{rec}$$

denoted as $$Y_{LR-down}^{rec}.$$

a) In one example, the down-sample method is bi-linear interpolation.
b) In one example, the down-sample method is bi-cubic interpolation.
c) In one example, the down-sample method is convolution with stride equal to the scaling ratio for original frame.
d) In one example, the down-sample method is the inverse of pixel shuffle, which is illustrated in FIG. 6.
6. Feed $$Y_{LR-down}^{rec}, U_{LR}^{rec}, V_{LR}^{rec},$$

and QP_MAP into the neural network designed for U and V channels. In one example, the neural network is illustrated in FIG. 11. FIG. 11 is a schematic diagram of an example of a neural network for reconstruction of U and V channels 1100. In FIG. 11, the term Down denotes the down-sampling. The term "Conv k×k, M" denotes the convolution with kernel size, k, and the number of filters is M. The term B is the number of residual blocks (RBs). The term R is the square of scaling ratio, r. The input of network consists of four parts: QP map, $$Y_{LR}^{rec}, U_{LR}^{rec}, \text{ and } U_{LR}^{rec}.$$

The QP map is the base QP for compression, and the $$Y_{LR}^{rec}, U_{LR}^{rec}, \text{ and } U_{LR}^{rec}$$

denote the low-resolution reconstruction frame for Y, U, and V channels, respectively. The $$U_{HR}^{rec} \text{ and } V_{HR}^{rec}$$

denotes the high-resolution reconstruction of U and V channels, respectively.
a) In one example, residual blocks is shown in FIG. 4.
b) In one example, the up-sampling layer is the pixel shuffle layer.
c) Alternatively, the up-sampling block can use the deconvolution with stride equal to the up-scaling ratio.
d) In another example, the body of neural network can be different, as long as it has one up-sampling layer before the output of neural network.

Figure 12:
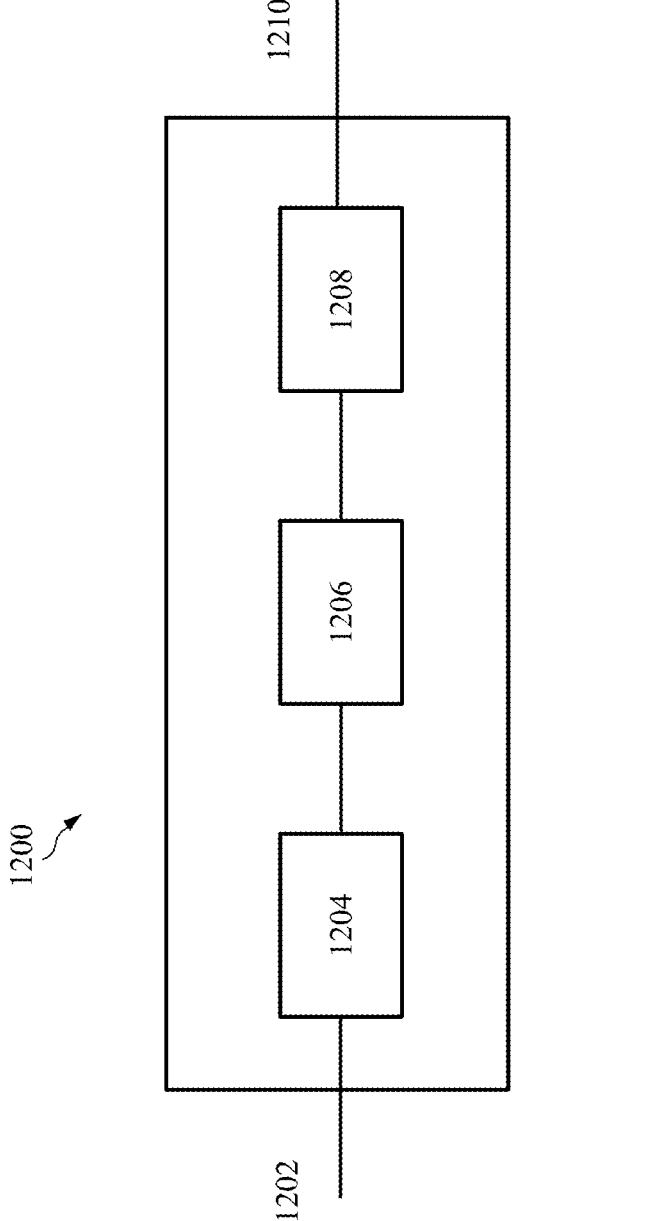
FIG. 12 is a block diagram showing an example video processing system.

FIG. 12 is a block diagram showing an example video processing system 1200 in which various techniques disclosed herein may be implemented. Various implementations may include some or all of the components of the video processing system 1200. The video processing system 1200 may include input 1202 for receiving video content. The video content may be received in a raw or uncompressed format, e.g., 8 or 10 bit multi-component pixel values, or may be in a compressed or encoded format. The input 1202 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The video processing system 1200 may include a coding component 1204 that may implement the various coding or encoding methods described in the present disclosure. The coding component 1204 may reduce the average bitrate of video from the input 1202 to the output of the coding component 1204 to produce a coded representation of the video. The coding techniques are therefore sometimes called video compression or video transcoding techniques. The output of the coding component 1204 may be either stored, or transmitted via a communication connected, as represented by the component 1206. The stored or communicated bitstream (or coded) representation of the video received at the input 1202 may be used by the component 1208 for generating pixel values or displayable video that is sent to a display interface 1210. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), Peripheral Component Interconnect (PCI), Integrated Drive Electronics (IDE) interface, and the like. The techniques described in the present disclosure may be embodied in various electronic devices such as mobile phones, laptops, smartphones or other devices that are capable of performing digital data processing and/or video display.

FIG. 13 is a block diagram of a video processing apparatus 1300. The video processing apparatus 1300 may be used to implement one or more of the methods described herein. The video processing apparatus 1300 may be embodied in a smartphone, tablet, computer, Internet of Things (IoT) receiver, and so on. The video processing apparatus 1300 may include one or more processors 1302, one or more memories 1304 and video processing hardware 1306 (a.k.a., video processing circuitry). The processor(s) 1302 may be configured to implement one or more methods described in the present disclosure. The memory (memories) 1304 may be used for storing data and code used for implementing the methods and techniques described herein. The video processing hardware 1306 may be used to implement, in hardware circuitry, some techniques described in the present disclosure. In some embodiments, the video processing hardware 1306 may be partly or completely located within the processor 1302, e.g., a graphics processor.

FIG. 14 is a block diagram that illustrates an example of a video coding system 1400 that may utilize the techniques of this disclosure. As shown in FIG. 14, the video coding system 1400 may include a source device 1410 and a destination device 1420. Source device 1410 generates encoded video data which may be referred to as a video encoding device. Destination device 1420 may decode the encoded video data generated by source device 1410 which may be referred to as a video decoding device.

Source device 1410 may include a video source 1412, a video encoder 1414, and an input/output (I/O) interface 1416.

Video source 1412 may include a source such as a video capture device, an interface to receive video data from a video content provider, and/or a computer graphics system for generating video data, or a combination of such sources. The video data may comprise one or more pictures. Video encoder 1414 encodes the video data from video source 1412 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 1416 may include a modulator/demodulator (modem) and/or a transmitter. The encoded video data may be transmitted directly to destination device 1420 via I/O interface 1416 through network 1430. The encoded video data may also be stored onto a storage medium/server 1440 for access by destination device 1420.

Destination device 1420 may include an I/O interface 1426, a video decoder 1424, and a display device 1422.

I/O interface 1426 may include a receiver and/or a modem. I/O interface 1426 may acquire encoded video data from the source device 1410 or the storage medium/server 1440. Video decoder 1424 may decode the encoded video data. Display device 1422 may display the decoded video data to a user. Display device 1422 may be integrated with the destination device 1420, or may be external to destination device 1420 which may be configured to interface with an external display device.

Video encoder 1414 and video decoder 1424 may operate according to a video compression standard, such as the High Efficiency Video Coding (HEVC) standard, Versatile Video Coding (VVC) standard, and other current and/or further standards.

FIG. 15 is a block diagram illustrating an example of a video encoder 1500, which may be video encoder 1414 in the video coding system 1400 illustrated in FIG. 14.

Video encoder 1500 may be configured to perform any or all of the techniques of this disclosure. In the example of FIG. 15, video encoder 1500 includes a plurality of functional components. The techniques described in this disclosure may be shared among the various components of video encoder 1500. In some examples, a processor may be configured to perform any or all of the techniques described in this disclosure.

The functional components of video encoder 1500 may include a partition unit 1501, a prediction unit 1502 which may include a mode selection unit 1503, a motion estimation unit 1504, a motion compensation unit 1505 and an intra prediction unit 1506, a residual generation unit 1507, a transform unit 1508, a quantization unit 1509, an inverse quantization unit 1510, an inverse transform unit 1511, a reconstruction unit 1512, a buffer 1513, and an entropy encoding unit 1514.

In other examples, video encoder 1500 may include more, fewer, or different functional components. In an example, prediction unit 1502 may include an intra block copy (IBC) unit. The IBC unit may perform prediction in an IBC mode in which at least one reference picture is a picture where the current video block is located.

Furthermore, some components, such as motion estimation unit 1504 and motion compensation unit 1505 may be highly integrated, but are represented in the example of FIG. 15 separately for purposes of explanation.

Partition unit 1501 may partition a picture into one or more video blocks. Video encoder 1414 and video decoder 1424 of FIG. 14 may support various video block sizes.

Mode selection unit 1503 may select one of the coding modes, intra or inter, e.g., based on error results, and provide the resulting intra- or inter-coded block to a residual generation unit 1507 to generate residual block data and to a reconstruction unit 1512 to reconstruct the encoded block for use as a reference picture. In some examples, mode selection unit 1503 may select a combination of intra and inter prediction (CIIP) mode in which the prediction is based on an inter prediction signal and an intra prediction signal. Mode selection unit 1503 may also select a resolution for a motion vector (e.g., a sub-pixel or integer pixel precision) for the block in the case of inter-prediction.

To perform inter prediction on a current video block, motion estimation unit 1504 may generate motion information for the current video block by comparing one or more reference frames from buffer 1513 to the current video block. Motion compensation unit 1505 may determine a predicted video block for the current video block based on the motion information and decoded samples of pictures from buffer 1513 other than the picture associated with the current video block.

Motion estimation unit 1504 and motion compensation unit 1505 may perform different operations for a current video block, for example, depending on whether the current video block is an I slice, a P slice, or a B slice. I-slices (or I-frames) are the least compressible but don't require other video frames to decode. P-slices (or P-frames) can use data from previous frames to decompress and are more compressible than I-frames. B-slices (or B-frames) can use both previous and forward frames for data reference to get the highest amount of data compression.

In some examples, motion estimation unit 1504 may perform uni-directional prediction for the current video block, and motion estimation unit 1504 may search reference pictures of list 0 or list 1 for a reference video block for the current video block. Motion estimation unit 1504 may then generate a reference index that indicates the reference picture in list 0 or list 1 that contains the reference video block and a motion vector that indicates a spatial displacement between the current video block and the reference video block. Motion estimation unit 1504 may output the reference index, a prediction direction indicator, and the motion vector as the motion information of the current video block. Motion compensation unit 1505 may generate the predicted video block of the current block based on the reference video block indicated by the motion information of the current video block.

In other examples, motion estimation unit 1504 may perform bi-directional prediction for the current video block, motion estimation unit 1504 may search the reference pictures in list 0 for a reference video block for the current video block and may also search the reference pictures in list 1 for another reference video block for the current video block. Motion estimation unit 1504 may then generate reference indexes that indicate the reference pictures in list 0 and list 1 containing the reference video blocks and motion vectors that indicate spatial displacements between the reference video blocks and the current video block. Motion estimation unit 1504 may output the reference indexes and the motion vectors of the current video block as the motion information of the current video block. Motion compensation unit 1505 may generate the predicted video block of the current video block based on the reference video blocks indicated by the motion information of the current video block.

In some examples, motion estimation unit 1504 may output a full set of motion information for decoding processing of a decoder.

In some examples, motion estimation unit 1504 may not output a full set of motion information for the current video. Rather, motion estimation unit 1504 may signal the motion information of the current video block with reference to the motion information of another video block. For example, motion estimation unit 1504 may determine that the motion information of the current video block is sufficiently similar to the motion information of a neighboring video block.

In one example, motion estimation unit 1504 may indicate, in a syntax structure associated with the current video block, a value that indicates to the video decoder 1424 of FIG. 14 that the current video block has the same motion information as another video block.

In another example, motion estimation unit 1504 may identify, in a syntax structure associated with the current video block, another video block and a motion vector difference (MVD). The motion vector difference indicates a difference between the motion vector of the current video block and the motion vector of the indicated video block. The video decoder 1424 of FIG. 14 may use the motion vector of the indicated video block and the motion vector difference to determine the motion vector of the current video block.

As discussed above, video encoder 1414 of FIG. 14 may predictively signal the motion vector. Two examples of predictive signaling techniques that may be implemented by video encoder 1414 of FIG. 14 include advanced motion vector prediction (AMVP) and merge mode signaling.

Intra prediction unit 1506 may perform intra prediction on the current video block. When intra prediction unit 1506 performs intra prediction on the current video block, intra prediction unit 1506 may generate prediction data for the current video block based on decoded samples of other video blocks in the same picture. The prediction data for the current video block may include a predicted video block and various syntax elements.

Residual generation unit 1507 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block, for example in a skip mode, and residual generation unit 1507 may not perform the subtracting operation.

Transform unit 1508 may generate one or more transform coefficient video blocks for the current video block by applying one or more transforms to a residual video block associated with the current video block.

After transform unit 1508 generates a transform coefficient video block associated with the current video block, quantization unit 1509 may quantize the transform coefficient video block associated with the current video block based on one or more quantization parameter (QP) values associated with the current video block.

Inverse quantization unit 1510 and inverse transform unit 1511 may apply inverse quantization and inverse transforms to the transform coefficient video block, respectively, to reconstruct a residual video block from the transform coefficient video block. Reconstruction unit 1512 may add the reconstructed residual video block to corresponding samples from one or more predicted video blocks generated by the prediction unit 1502 to produce a reconstructed video block associated with the current block for storage in the buffer 1513.

After reconstruction unit 1512 reconstructs the video block, loop filtering operation may be performed to reduce video blocking artifacts in the video block.

Entropy encoding unit 1514 may receive data from other functional components of the video encoder 1500. When entropy encoding unit 1514 receives the data, entropy encoding unit 1514 may perform one or more entropy encoding operations to generate entropy encoded data and output a bitstream that includes the entropy encoded data.

FIG. 16 is a block diagram illustrating an example of a video decoder 1600, which may be video decoder 1424 in the video coding system 1400 illustrated in FIG. 14.

The video decoder 1600 may be configured to perform any or all of the techniques of this disclosure. In the example of FIG. 16, the video decoder 1600 includes a plurality of functional components. The techniques described in this disclosure may be shared among the various components of the video decoder 1600. In some examples, a processor may be configured to perform any or all of the techniques described in this disclosure.

In the example of FIG. 16, video decoder 1600 includes an entropy decoding unit 1601, a motion compensation unit 1602, an intra prediction unit 1603, an inverse quantization unit 1604, an inverse transformation unit 1605, a reconstruction unit 1606 and a buffer 1607. Video decoder 1600 may, in some examples, perform a decoding pass generally reciprocal to the encoding pass described with respect to video encoder 1414 (FIG. 14).

Entropy decoding unit 1601 may retrieve an encoded bitstream. The encoded bitstream may include entropy coded video data (e.g., encoded blocks of video data). Entropy decoding unit 1601 may decode the entropy coded video data, and from the entropy decoded video data, motion compensation unit 1602 may determine motion information including motion vectors, motion vector precision, reference picture list indexes, and other motion information. Motion compensation unit 1602 may, for example, determine such information by performing the AMVP and merge mode signaling.

Motion compensation unit 1602 may produce motion compensated blocks, possibly performing interpolation based on interpolation filters. Identifiers for interpolation filters to be used with sub-pixel precision may be included in the syntax elements.

Motion compensation unit 1602 may use interpolation filters as used by video encoder 1414 during encoding of the video block to calculate interpolated values for sub-integer pixels of a reference block. Motion compensation unit 1602 may determine the interpolation filters used by video encoder 1414 according to received syntax information and use the interpolation filters to produce predictive blocks.

Motion compensation unit 1602 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 1603 may use intra prediction modes for example received in the bitstream to form a prediction block from spatially adjacent blocks. Inverse quantization unit 1604 inverse quantizes, i.e., de-quantizes, the quantized video block coefficients provided in the bitstream and decoded by entropy decoding unit 1601. Inverse transform unit 1605 applies an inverse transform.

Reconstruction unit 1606 may sum the residual blocks with the corresponding prediction blocks generated by motion compensation unit 1602 or intra-prediction unit 1603 to form decoded blocks. If desired, a deblocking filter may also be applied to filter the decoded blocks in order to remove blockiness artifacts. The decoded video blocks are then stored in buffer 1607, which provides reference blocks for subsequent motion compensation/intra prediction and also produces decoded video for presentation on a display device.

FIG. 17 is a method 1700 of processing video data according to an embodiment of the disclosure. The method 1700 may be performed by a coding apparatus (e.g., an encoder) having a processor and a memory. The method 1700 may be implemented when SR or up-sampling is desired.

In block 1702, the coding apparatus applies a super resolution (SR) process to a video unit at a specific position relative to one or more in-loop filters when the one or more in-loop filters are applied to the video unit.

In block 1704, the coding apparatus performs a conversion between a video comprising the video unit and a bitstream of the video based on the SR process and the one or more in-loop filters as applied. When implemented in an encoder, converting includes receiving a video file (e.g., a video unit) and encoding the video file into a bitstream. When implemented in a decoder, converting includes receiving a bitstream including the video file, and decoding the bitstream to obtain the video file.

In an embodiment, the specific position of the SR process is prior to the one or more in-loop filters. That is, the SR process is encountered before the one or more in-loop filters.

In an embodiment, the specific position is immediately after the video unit has been reconstructed. For example, the specific position follows the combination of the prediction and residual as depicted in FIGS. 5A-5D.

In an embodiment, the video unit comprises a block, and wherein the block comprises one of a coding tree unit (CTU) and a coding tree block (CTB). A CTU comprises CTB of luma samples, two corresponding CTBs of chroma samples of a picture that has three sample arrays, or a CTB of samples of a monochrome picture, and syntax structures used to code the samples. A CTB comprises an N×N block of samples for some value of N such that the division of a component into CTBs is a partitioning.

In an embodiment, the video unit comprises a region, and wherein the region comprises a coding tree unit (CTU) row.

In an embodiment, the one or more in-loop filters comprise a first in-loop filter (e.g., DBF) and a second in-loop filter (e.g., SAO), and wherein the specific position is after the first in-loop filter and prior to the second in-loop filter. In an embodiment, the one or more in-loop filters comprise a deblocking filter (DBF), and wherein the specific position is prior to the DBF. In an embodiment, the one or more in-loop filters comprise a deblocking filter (DBF) and a sample adaptive offset (SAO), and wherein the specific position is after the DBF and prior to the SAO. In an embodiment, the one or more in-loop filters comprise a sample adaptive offset (SAO) and an adaptive loop filter (ALF), and wherein the specific position is after the SAO and prior to the ALF. In an embodiment, the one or more in-loop filters comprise an adaptive loop filter (ALF), and wherein the specific position is after the ALF. In an embodiment, the one or more in-loop filters comprise a sample adaptive offset (SAO), and wherein the specific position is prior to the SAO. In an embodiment, the one or more in-loop filters comprise an adaptive loop filter (ALF), and wherein the specific position is prior to the ALF.

In an embodiment, the one or more in-loop filters comprise a first filter, and wherein the specific position is prior to the first filter when the first filter accounts for an original video unit (e.g., an original picture or an original frame).

In an embodiment, the specific position is included in a bitstream. That is, the specific position is signaled in the bitstream. For example, the specific position may be identified in a parameter set, in a header, etc., of the bitstream.

In an embodiment, the specific position is derived based on decoded information.

In an embodiment, the method further includes applying the SR process to the video unit without regard to the specific position when the one or more in-loop filters are not applied to the video unit.

In an embodiment, the one or more in-loop filters comprise a deblocking filter (DBF), a sample adaptive offset (SAO) and an adaptive loop filter (ALF), and wherein the method further comprises applying the SR process to the video unit without regard to the specific position when the DBF, SAO, and ALF are disabled (e.g., turned off).

In an embodiment, the one or more in-loop filters comprise an adaptive loop filter (ALF), and wherein the method further comprises applying the SR process to the video unit without regard to the specific position when the ALF is disabled.

In an embodiment, the one or more in-loop filters comprise a cross component adaptive loop filter (CC-ALF), wherein the video unit comprises chroma components, and wherein the method further comprises applying the SR process to the chroma components without regard to the specific position when the CC-ALF is disabled.

In an embodiment, signaling of side information for the one or more in-loop filters is dependent on application of the SR process. In an embodiment, side information is treated as meta-data that provides some useful information/property of the SR process. For example, suppose there are 4 candidate sets of CNN models for the SR process and a best one is selected from these 4 CNN models. The index of the selected model is signaled in the bitstream as the side information. As such, the decoder is able to recognize the best model and use that model to perform SR process. In an embodiment, the side information comprises a filter parameter, a filter mode, or other coding information. In an embodiment, application of the SR process is dependent on a usage of an in-loop filtering method.

In an embodiment, the SR process is applied by a neural network (NN)-based SR network comprising a plurality of convolutional layers, and wherein the plurality of convolutional layers includes an up-sampling layer configured to up-sample a resolution of the video unit.

In an embodiment, the up-sampling layer applies deconvolution with a stride of K to up-sample the resolution of the video unit, where K is an integer greater than 1. In an embodiment, K is dependent on decoded information.

In an embodiment, the up-sampling layer applies pixel shuffling to up-sample the resolution of the video unit. In an embodiment, a resolution of an input of the NN-based SR network is 1/K of an original input, where K is a down-sampling ratio.

In an embodiment, a first convolutional layer from the plurality of convolutional layers is configured to fuse an input of the NN-based SR network to generate feature maps.

In an embodiment, the NN-based SR network further comprises sequentially stacked residual blocks, and wherein the sequentially stacked residual blocks are configured to process the feature maps received from the first convolutional layer.

In an embodiment, a last convolutional layer from the plurality of convolutional layers is configured to process the feature maps received from a last residual block from the sequentially stacked residual blocks to produce R feature maps, where R equals K*K.

In an embodiment, a shuffle layer is configured to generate the video unit based on the R feature maps, and wherein a spatial resolution of the video unit is the same as the spatial resolution of the original input.

In an embodiment, one or more of the sequentially stacked residual blocks consists of, in sequential order, the first convolutional layer, a parametric rectified linear unit (PReLU) activation function, and a second convolutional layer from the plurality of convolutional layers.

In an embodiment, an input of the first convolutional layer is added to an output of the second convolutional layer.

In an embodiment, the SR process is applied by a neural network (NN)-based SR network, and wherein an input of the SR process is at the video unit level, wherein the video unit is a sequence of pictures, a picture, a slice, a tile, a brick, a subpicture, one or more coding tree unit (CTUs), a CTU row, one or more coding units (CUs), one or more coding tree blocks (CTBs), or a region covering more than one pixel (a.k.a., sample).

A slice is an integer number of complete tiles or an integer number of consecutive complete CTU rows within a tile of a picture that are exclusively contained in a single network abstraction (NAL) unit. A tile is a rectangular region of CTUs within a particular tile column and a particular tile row in a picture. A brick is a rectangular region of CTU rows within a particular tile in a picture. A subpicture is a rectangular region of one or more slices within a picture.

A CU comprises a coding block of luma samples, two corresponding coding blocks of chroma samples of a picture that has three sample arrays in the single tree mode, or a coding block of luma samples of a picture that has two sample arrays in the dual tree mode, or two coding blocks of chroma samples of a picture that has three sample arrays in the dual tree mode, or a coding block of samples of a monochrome picture, and syntax structures used to code the samples. A coding block comprises an M×N block of samples for some values of M and N such that the division of a CTB into coding blocks is a partitioning.

In an embodiment, the SR process is applied by a neural network (NN)-based SR network, and wherein an input of the SR process is a coding tree unit (CTU), and wherein the CTU has been down-sampled.

In an embodiment, the SR process is applied by a neural network (NN)-based SR network, and wherein an input of the SR process is a frame, and wherein the frame has been down-sampled.

In an embodiment, the SR process is applied by a neural network (NN)-based SR network, and wherein an input of the SR process comprises a luma component of reconstruction.

In an embodiment, the SR process is applied by a neural network (NN)-based SR network, and wherein an input of the SR process comprises a chroma component of reconstruction.

In an embodiment, the SR process is applied by a neural network (NN)-based SR network, and wherein an input of the SR process comprises both luma and chroma components of reconstruction.

In an embodiment, the SR process is applied by a neural network (NN)-based SR network, wherein an input of the SR process comprises a luma component, and wherein an output of the SR process comprises an up-sampled chroma component.

In an embodiment, the SR process is applied by a neural network (NN)-based SR network, wherein an input of the SR process comprises a chroma component, and wherein an output of the SR process comprises an up-sampled luma component.

In an embodiment, the SR process is applied by a neural network (NN)-based SR network, and wherein an input of the SR process comprises decoded side information. In an embodiment, an input of the SR process comprises a prediction picture, and wherein an output of the SR process is an up-sampled prediction picture.

In an embodiment, the method 1700 may utilize or incorporate one or more of the features or processes of the other methods disclosed herein.

A listing of solutions preferred by some embodiments is provided next.

The following solutions show example embodiments of techniques discussed in the present disclosure (e.g., Example 1).

1. A method of video processing, comprising: performing a conversion between a video comprising one or more video units and a bitstream of the video, wherein, during the conversion, a super resolution SR process in which a resolution of input pixels is changed at output pixels is selectively applied in an order according to a rule.

2. The method of solution 1, wherein the SR process is prior to an in-loop filtering process in an encoding order.

3. The method of solution 1, wherein the SR process is after an in-loop filtering process in an encoding order.

4. The method of any of solutions 1-3, wherein the in-loop filtering process includes a sample adaptive offset or an adaptive loop filter process.

5. The method of any of solutions 1-4, wherein the order is indicated in the bitstream.

6. The method of any of solutions 1-4, wherein the order is not indicated in the bitstream.

7. The method of any of solutions 1-6, wherein the rule specifies that the SR process and the in-loop process are mutually exclusive for certain types of in-loop filters.

8. The method of solution 7, wherein the certain types of in-loop filters include a sample adaptive offset or an adaptive loop filter.

9. A method of video processing, comprising: performing a conversion between a video comprising one or more video units and a bitstream of the video, wherein, during the conversion, a super resolution SR process in which a resolution of input pixels is changed at output pixels is selectively applied using a neural network (NN) having multiple convolutional layers according to a rule.

10. The method of solution 9, wherein the conversion includes using a de-convolution with stride K for upsampling during the SR process, where K is an integer greater than 1.

11. The method of solution 10, wherein the upsampling includes performing pixel shuffling.

12. A method of video processing, comprising: performing a conversion between a video comprising one or more video units and a bitstream of the video, wherein, during the conversion, a super resolution SR process in which a resolution of input pixels is changed at output pixels is performed, wherein the input pixels are according to a rule.

13. The method of solution 12, wherein the rule specifies that the input pixels are from a video sequence or a video picture or a video slice or a video tile or a video brick or a video subpicture of a coding tree unit or a coding tree unit row, a coding unit, a coding tree block or a rectangular pixel region.

14. The method of solution 12, wherein the rule specifies a color component to which the input pixels belong.

15. The method of solution 14, wherein the color component is a luma component.

16. The method of any of solutions 12-15, wherein the rule specifies to further use side information as an input to the SR process.

17. The method of any of above solutions wherein the video unit comprises a picture or a slice.

18. The method of any of solutions 1-17, wherein the conversion includes generating the bitstream from the video.

19. The method of any of solutions 1-17, wherein the conversion includes generating the video from the bitstream.

20. A video decoding apparatus comprising a processor configured to implement a method recited in one or more of solutions 1 to 19.

21. A video encoding apparatus comprising a processor configured to implement a method recited in one or more of solutions 1 to 19.

22. A computer program product having computer code stored thereon, the code, when executed by a processor, causes the processor to implement a method recited in any of solutions 1 to 19.

23. A method of video processing comprising generating a bitstream according to a method recited in any one or more of solutions 1-19, and storing the bitstream on a computer readable medium.

24. A method, an apparatus or a system described in the present disclosure.

The following documents are incorporated by reference in their entirety:

[1] J. Chen, Y. Ye, S. Kim (editors), "Algorithm description for Versatile Video Coding and Test Model 8 (VTM 8)," JVET-Q2002.

[2] VTM software: https://vcgithhi.fraunhofer.de/jvet/ VVCSoftware_VTM.git

[3] W. Shi, J. Caballero, et al., "Real-Time Single Image and Video Super-Resolution Using an Efficient Sub-Pixel Convolutional Neural Network," Proceedings of the IEEE conference on computer vision and pattern recognition. 2016. arXiv:1609.05158

[4] J. Lin, D. Liu, H. Yang, H. Li, "Convolutional Neural Network-Based Block Up-Sampling for HEVC", TCSVT 2019.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disk read-only memory (CD ROM) and digital versatile disc-read only memory (DVD-ROM) disks. The processor and the memory can be supplemented by, or incorporated in, special purpose logic circuitry.

While this present disclosure contains many specifics, these should not be construed as limitations on the scope of any subject matter or of what may be claimed, but rather as descriptions of features that may be specific to particular embodiments of particular techniques. Certain features that are described in this present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this present disclosure should not be understood as requiring such separation in all embodiments.

Only a few implementations and examples are described and other implementations, enhancements and variations can be made based on what is described and illustrated in this present disclosure.

While this present disclosure contains many specifics, these should not be construed as limitations on the scope of any subject matter or of what may be claimed, but rather as descriptions of features that may be specific to particular embodiments of particular techniques. Certain features that are described in this present disclosure in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this present disclosure should not be understood as requiring such separation in all embodiments.

Only a few implementations and examples are described and other implementations, enhancements and variations can be made based on what is described and illustrated in this present disclosure.

What is claimed is:

1. A method of processing video data, comprising:
    applying, during a conversion between a video comprising a video unit and a bitstream of the video, a super resolution (SR) process to the video unit at a specific position relative to one or more in-loop filters when the one or more in-loop filters are applied to the video unit; and
performing the conversion based on the SR process and the one or more in-loop filters as applied;
wherein the specific position is immediately after the video unit has been reconstructed;
wherein the SR process is applied by a neural network (NN)-based SR network,
wherein an input of the SR process comprises a luma component, and wherein an output of the SR process comprises an up-sampled chroma component, or alternatively,
wherein the input of the SR process comprises a chroma component, and wherein the output of the SR process comprises an up-sampled luma component, and
wherein an up-sampling layer configured to up-sample a resolution of the video unit applies de-convolution with a stride of K to up-sample the resolution of the video unit, where K is an integer greater than 1, and wherein K is dependent on decoded information.

2. The method of claim 1, wherein the specific position of the SR process is prior to the one or more in-loop filters.

3. The method of claim 1, wherein the video unit is a block, and wherein the block comprises one of a coding tree unit (CTU) or a coding tree block (CTB), or wherein the video unit is a region, and wherein the region comprises a CTU row.

4. The method of claim 1, the specific position satisfies at least one of the following conditions:
    wherein the one or more in-loop filters comprise a deblocking filter (DBF), and wherein the specific position is prior to the DBF,
    wherein the one or more in-loop filters comprise the DBF and a sample adaptive offset (SAO), and wherein the specific position is after the DBF and prior to the SAO,
    wherein the one or more in-loop filters comprise the SAO and an adaptive loop filter (ALF), and wherein the specific position is after the SAO and prior to the ALF,
    wherein the one or more in-loop filters comprise the ALF, and wherein the specific position is after the ALF, and
    wherein the one or more in-loop filters comprise the SAO, and wherein the specific position is prior to the SAO, or wherein the one or more in-loop filters comprise the ALF, and wherein the specific position is prior to the ALF.

5. The method of claim 1, wherein the one or more in-loop filters comprise a first filter, and whether the specific position is prior to the first filter depends on whether the first filter uses information from an original image.

6. The method of claim 1, wherein an indication of the specific position is included in the bitstream, or wherein the specific position is derived based on decoded information.

7. The method of claim 1, further comprising applying the SR process to the video unit without regard to the specific position when the one or more in-loop filters are not applied to the video unit,
    wherein the one or more in-loop filters comprise a deblocking filter (DBF), a sample adaptive offset (SAO) and an adaptive loop filter (ALF), and wherein the method further comprises applying the SR process to the video unit without regard to the specific position when the DBF, the SAO, and the ALF are disabled, or
    wherein the one or more in-loop filters comprise the ALF, and wherein the method further comprises applying the SR process to the video unit without regard to the specific position when the ALF is disabled, or wherein the one or more in-loop filters comprise a cross component adaptive loop filter (CC-ALF), wherein the video unit comprises chroma components, and wherein the method further comprises applying the SR process to the chroma components without regard to the specific position when the CC-ALF is disabled.

8. The method of claim 7, wherein signaling of side information for the one or more in-loop filters is dependent on application of the SR process, and wherein application of the SR process is dependent on a usage of an in-loop filtering method.

9. The method of claim 1, wherein the NN-based SR network comprises a plurality of convolutional layers, and wherein the plurality of convolutional layers includes the up-sampling layer configured to up-sample the resolution of the video unit.

10. The method of claim 9, wherein the up-sampling layer applies pixel shuffling to up-sample the resolution of the video unit, wherein a resolution of an input of the NN-based SR network is 1/K of an original input, where K is a down-sampling ratio, wherein a first convolutional layer from the plurality of convolutional layers is configured to fuse the input of the NN-based SR network to generate feature maps, wherein the NN-based SR network further comprises sequentially stacked residual blocks, and wherein the sequentially stacked residual blocks are configured to process the feature maps received from the first convolutional layer, wherein a last convolutional layer from the plurality of convolutional layers is configured to process feature maps received from a last residual block from the sequentially stacked residual blocks to produce R feature maps, where R equals K*K, and wherein a shuffle layer is configured to generate the video unit based on the R feature maps, and wherein a spatial resolution of the video unit is the same as a spatial resolution of the original input.

11. The method of claim 10, wherein one or more of the sequentially stacked residual blocks consists of, in sequential order, the first convolutional layer, a parametric rectified linear unit (PReLU) activation function, and a second convolutional layer from the plurality of convolutional layers, and wherein an input of the first convolutional layer is added to an output of the second convolutional layer.

12. The method of claim 1, wherein the input of the SR process is at a video unit level, wherein the video unit is a sequence of pictures, a picture, a slice, a tile, a brick, a subpicture, one or more coding tree units (CTUs), a CTU row, one or more coding units (CUs), one or more coding tree blocks (CTBs), or a region covering more than one pixel.

13. The method of claim 1, wherein the input of the SR process satisfies one of:

wherein the input of the SR process is a coding tree unit (CTU), and wherein the CTU has been down-sampled, wherein the input of the SR process is a frame, and wherein the frame has been down-sampled, or wherein the input of the SR process comprises at least one of: a luma component of reconstruction, a chroma component of reconstruction, or both luma and chroma components of a same reconstruction.

14. The method of claim 1, wherein the input of the SR process comprises decoded side information, and wherein the input of the SR process comprises a prediction picture, and wherein the output of the SR process is an up-sampled prediction picture.

15. The method of claim 1, wherein the conversion includes encoding the video into the bitstream.

16. The method of claim 1, wherein the conversion includes decoding the video from the bitstream.

17. An apparatus for processing media data comprising a processor and a non-transitory memory with instructions thereon, wherein the instructions upon execution by the processor, cause the processor to:

apply, during a conversion between a video comprising a video unit and a bitstream of the video, a super resolution (SR) process to the video unit at a specific position relative to one or more in-loop filters when the one or more in-loop filters are applied to the video unit; and perform the conversion based on the SR process and the one or more in-loop filters as applied;

wherein the specific position is immediately after the video unit has been reconstructed;

wherein the SR process is applied by a neural network (NN)-based SR network, wherein an input of the SR process comprises a luma component, and wherein an output of the SR process comprises an up-sampled chroma component, or alternatively, wherein the input of the SR process comprises a chroma component, and wherein the output of the SR process comprises an up-sampled luma component, and wherein an up-sampling layer configured to up-sample a resolution of the video unit applies de-convolution with a stride of K to up-sample the resolution of the video unit, where K is an integer greater than 1, and wherein K is dependent on decoded information.

18. A method for storing a bitstream of a video, comprising:

applying, for the video comprising a video unit, a super resolution (SR) process to the video unit at a specific position relative to one or more in-loop filters when the one or more in-loop filters are applied to the video unit;

generating the bitstream based on the SR process and the one or more in-loop filters as applied; and storing the bitstream in a non-transitory computer-readable recording medium, wherein the specific position is immediately after the video unit has been reconstructed;

wherein the SR process is applied by a neural network (NN)-based SR network, wherein an input of the SR process comprises a luma component, and wherein an output of the SR process comprises an up-sampled chroma component, or alternatively, wherein the input of the SR process comprises a chroma component, and wherein the output of the SR process comprises an up-sampled luma component, and wherein an up-sampling layer configured to up-sample a resolution of the video unit applies de-convolution with a stride of K to up-sample the resolution of the video unit, where K is an integer greater than 1, and wherein K is dependent on decoded information.

* * * * *